United States Patent [19]
Iwasaki

[11] Patent Number: 6,118,514
[45] Date of Patent: Sep. 12, 2000

[54] IMAGE FORMING APPARATUS

[75] Inventor: Takeo Iwasaki, Nagoya, Japan

[73] Assignee: Brother Kogyo Kabushiki Kaisha, Nagoya, Japan

[21] Appl. No.: 09/154,712

[22] Filed: Sep. 17, 1998

[30] Foreign Application Priority Data

Sep. 17, 1997 [JP] Japan .................................. 9-251790

[51] Int. Cl.[7] ............................ G03B 27/52; G03B 27/32
[52] U.S. Cl. .............................................. 355/40; 355/27
[58] Field of Search .............................. 355/402, 70, 27, 355/40; 347/238; 313/500, 512, 113; 362/296, 297, 301, 341; 257/98; 430/138

[56] References Cited

U.S. PATENT DOCUMENTS

| | | |
|---|---|---|
| 4,399,209 | 8/1983 | Sanders et al. . |
| 4,440,846 | 4/1984 | Sanders et al. . |
| 4,935,665 | 6/1990 | Murata ..................................... 313/500 |
| 5,515,136 | 5/1996 | Nishio et al. .............................. 355/37 |

*Primary Examiner*—Safet Metjahic
*Assistant Examiner*—Hung Henry Nguyen
*Attorney, Agent, or Firm*—Oliff & Berridge, PLC

[57] ABSTRACT

In an image forming apparatus, an exposure head has blue light emitting elements, a base on which the blue light emitting elements are provided, bonding pads formed on the base, and an aluminum-made reflecting layer formed on each bonding pad. Each aluminum-made reflecting layer has a reflectivity of 90% or higher to blue light from the light emitting element with respect to the regular reflection component. Part of blue light generated by one of the light emitting elements may travel to an adhered surface of the light emitting element, but it is reflected by the aluminum-made reflecting layer without being absorbed by the adjacent bonding pad, so that that part of blue light is re-directed toward a microcapsule recording sheet. This construction considerably increases the power of blue light emitted from each blue light emitting element provided in the exposure head, thereby enabling provision of an image forming apparatus in which the power of light emitted from each blue light emitting element provided in an exposure device is considerably increased.

25 Claims, 14 Drawing Sheets

70A: WIDTH DETECTION DEVICE
70B: SCAN WIDTH CHANGING DEVICE
70C: SPEED CHANGING DEVICE

IMAGE FORMING APPARATUS

BACKGROUND OF THE INVENTION

1. Field of Invention

The invention relates to an image forming apparatus including a photosensitive recording medium having a photosensitive material that is sensitive to light of a predetermined wavelength, an exposure device for irradiating the photosensitive recording medium with light of the predetermined wavelength, and a development device for developing the photosensitive recording medium exposed by the exposure device.

2. Description of Related Art

Image forming apparatuses, as mentioned above, are disclosed in, for example, U.S. Pat. Nos. 4,440,846 and 4,399,209. In the image systems disclosed therein, a latent image is formed by exposing a photosensitive layer of a recording medium having microcapsules that contains a photosensitive substance in an internal phase, to radiant rays. The microcapsules are then ruptured by applying a uniform rupturing force, so that the internal-phase substance is released. The latent image is thereby made visible. More specifically, an exposed latent image is formed due to changes in the mechanical strength of the exposed microcapsules. To develop the exposed latent image, the capsules having low mechanical strength (that is, the capsules that did not undergo photo-setting or that underwent photo-softening) are destroyed by pressurization, so that the content of the capsules, such as coloring materials or the like, flows out.

SUMMARY OF THE INVENTION

An image forming apparatus including a photosensitive recording medium carrying microcapsules, an exposure head provided with a plurality of light emitting elements and being movable over the photosensitive recording medium, a conveyance device for moving the photosensitive recording medium, and a development device for developing the exposed photosensitive recording medium by pressurization, is presented.

In this image forming apparatus, the photosensitive recording medium is irradiated by three color light-emitting elements, that is, red, green and blue light-emitting elements, that are arranged as the exposure device on a substrate. Normally, such light emitting elements are adhered to a gold thin film formed on a base by etching. Since the reflectivity of gold to blue light color is as low as about 40%, the light generated in the light emitting elements is partly absorbed by the adhered surface, thereby reducing the power of light emitted.

In some cases, such light emitting elements are adhered to a ceramic base or an electrically insulating layer formed on a base. Since the reflectivity of the insulating layer or the ceramic substrate to blue light is at most about 20%, a large portion of light is absorbed or scattered by the base, thereby producing a large loss and reducing the power of light emitted.

Accordingly, one aspect of the invention is to provide an image forming apparatus that considerably increases the power of light emitted from a blue light emitting element provided in an exposure device.

According to this aspect of the invention, there is provided an image forming apparatus including a photosensitive recording medium having a photosensitive material that is sensitive to light having a predetermined wavelength, an exposure device that irradiates the photosensitive recording medium with light having the predetermined wavelength, and a development device that develops the photosensitive recording medium exposed by the exposure device. The exposure device includes a light emitting element that emits blue light, a base on which the light emitting element is provided, a thin film formed on the base, and a reflecting member provided on the thin film. The reflecting member is formed substantially from a material having a reflectivity of at least about 50% to blue light from the light emitting element with respect to a regular reflection component.

In this image forming apparatus, part of blue light generated by the light emitting element may travel to an adhered surface of the light emitting element, but it is reflected by the reflecting member without being absorbed by the thin film, so that that part of blue light is re-directed toward the photosensitive recording medium. Therefore, it is possible to considerably increase the power of light emitted from the blue light emitting element provided in the exposure device.

The reflecting member may include a reflecting layer formed by a vapor deposition method. The reflecting layer may be formed substantially from aluminum. If the reflecting member includes the reflecting layer formed by aluminum vapor deposition, the power of light emitted from the blue light emitting element provided in the exposure device can be greatly increased.

The reflecting layer may be formed substantially from at least one of nickel, chrome and silver. Furthermore, the reflecting layer may include a dielectric coating, and an insulating film.

Further, the reflecting member may include a reflecting layer formed by one of an etching method, a sputtering method, a print-applying method and a coating method.

According to another aspect of the invention, there is provided an image forming apparatus including a photosensitive recording medium having a photosensitive material that is sensitive to light having a predetermined wavelength, an exposure device that irradiates the photosensitive recording medium with light having the predetermined wavelength, and a development device that develops the photosensitive recording medium exposed by the exposure device. The exposure device includes a light emitting element that emits blue light, a base on which the light emitting element is provided, and a thin film formed on the base. The thin film is formed substantially from a material having a reflectivity of at least about 50% to blue light from the light emitting element with respect to a regular reflection component.

In this image forming apparatus, part of blue light generated by the light emitting element may travel to an adhered surface of the light emitting element, but it is reflected by the thin film without being absorbed by the thin film, so that that part of blue light is re-directed toward the photosensitive recording medium. Since the thin film is formed substantially from a material having a reflectivity of at least about 50% to blue light from the light emitting element with respect to the regular reflection component, it is not necessary to provide a reflecting member. Therefore, it becomes possible to reduce the number of production processes and the production cost.

The thin film may include a reflecting layer formed by a vapor deposition method, and may be formed substantially from aluminum.

The reflectivity of aluminum to blue light (represented by a wavelength of 450 nm) with respect to the regular reflection component is 92.2%, whereas the reflectivity of gold in the conventional art is 38.7%. In this construction, therefore, most part of blue light generated in the light emitting element is not absorbed by the thin film but directed toward the photosensitive recording medium.

If the thin film is formed by aluminum vapor deposition, it becomes unnecessary to provide a reflecting member, so that the number of production processes and the production cost can be reduced. Furthermore, the power of light emitted from the blue light emitting element provided in the exposure device can be greatly increased.

The thin film may be formed substantially from at least one of nickel, chrome and silver, and may include a dielectric coating, an insulating film, and a reflecting layer formed by one of an etching method, a sputtering method, a print-applying method and a coating method.

BRIEF DESCRIPTION OF THE DRAWINGS

A preferred embodiment of the invention will be described in detail with reference to the following figures wherein.

DETAILED DESCRIPTION OF PREFERRED EMBODIMENTS

Figure 1:
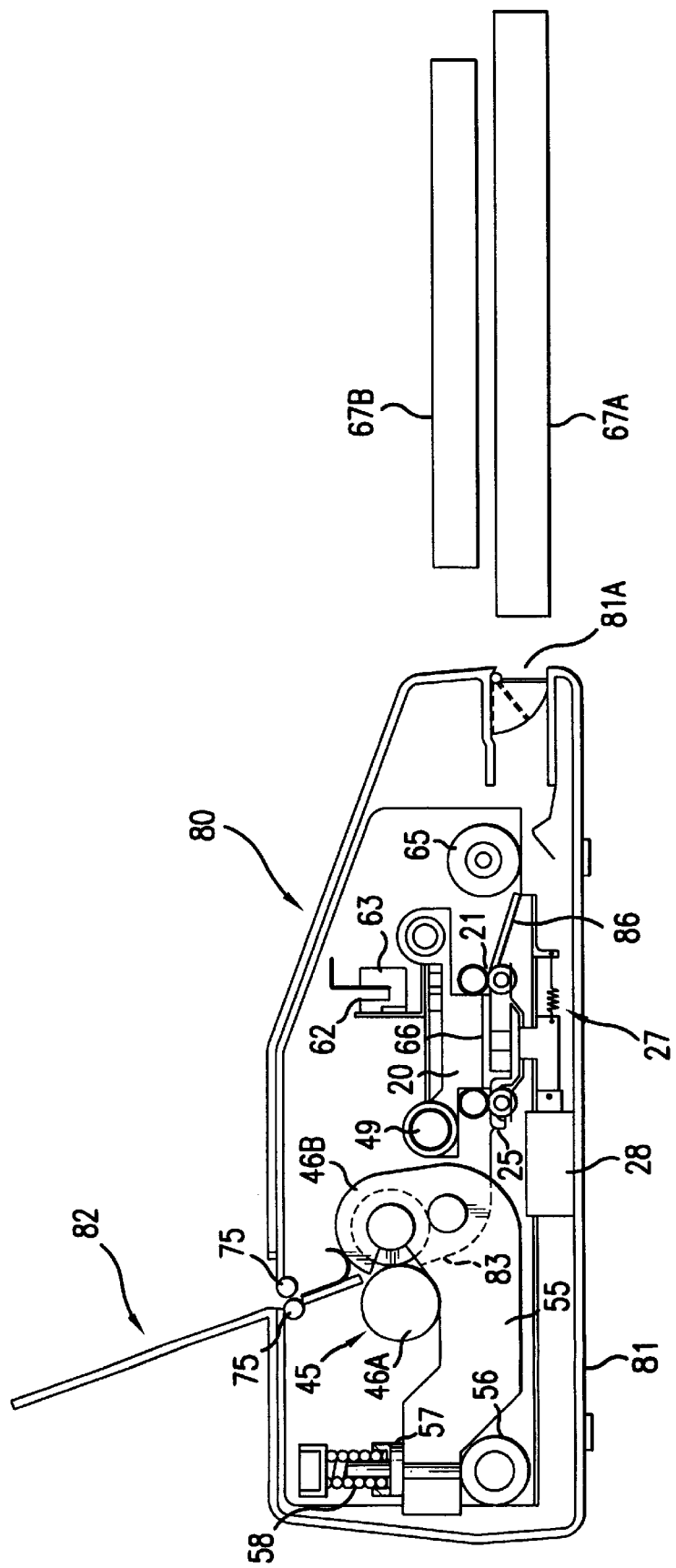
FIG. 1 is a side sectional view of a photosensitive and pressure-sensitive printer before light-proof cassettes containing microcapsule sheets that are photosensitive recording media are attached to the photosensitive and pressure-sensitive printer.
Figure 2:
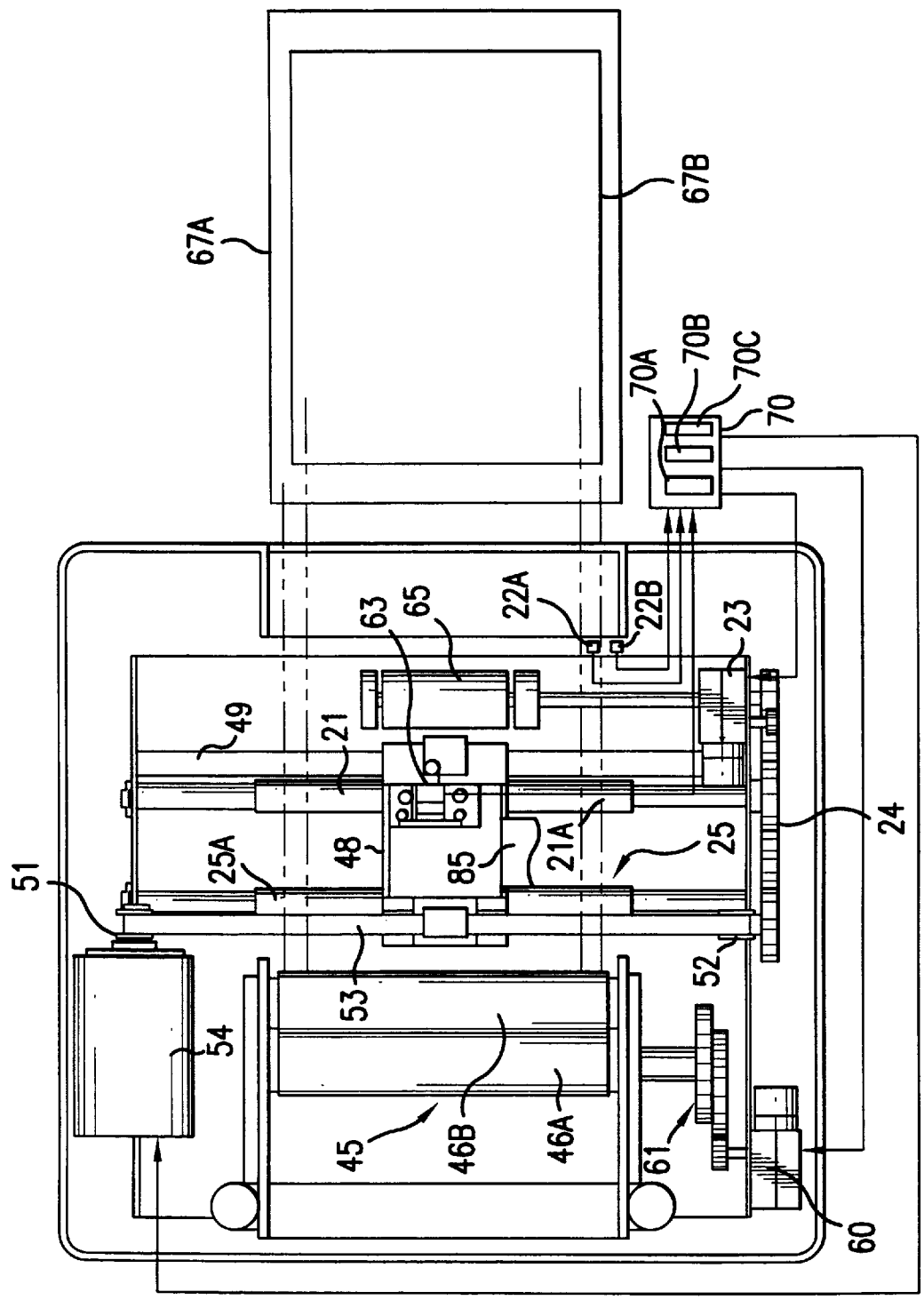
FIG. 2 is a plan view of the photosensitive and pressure-sensitive printer shown in FIG. 1.
Figure 3:
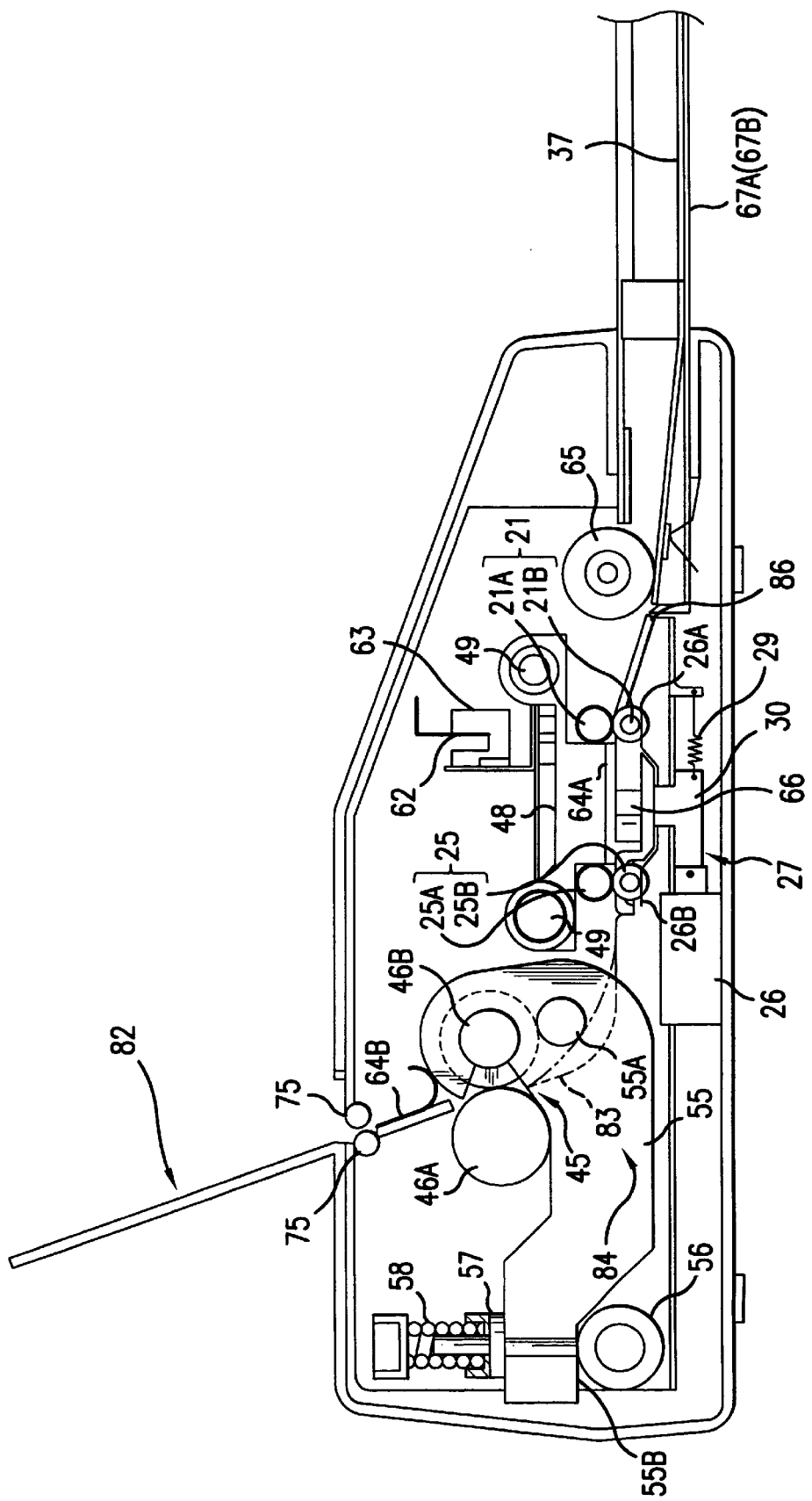
FIG. 3 is a side sectional view of the photosensitive and pressure-sensitive printer after the light-proof cassettes are attached.
Figure 4:
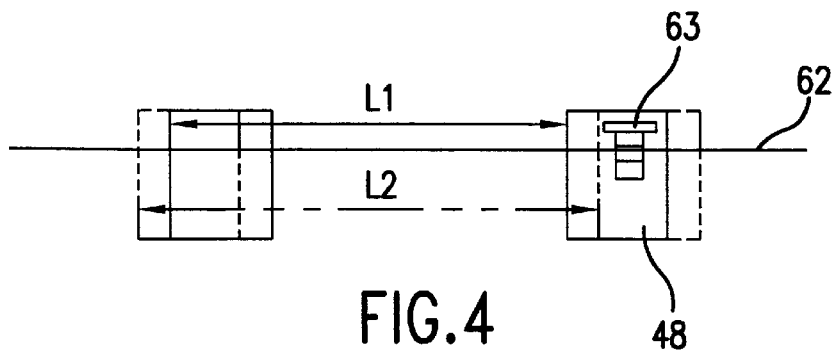
FIG. 4 illustrates a carriage mounted inside the photosensitive and pressure-sensitive printer.
Figure 5:
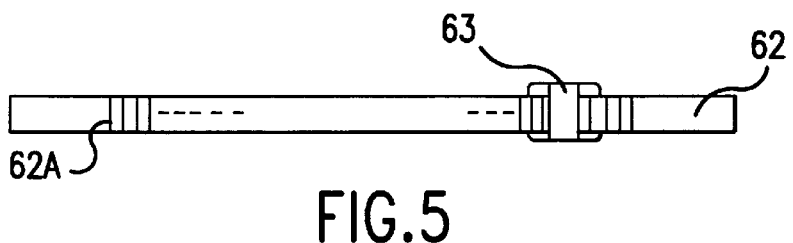
FIG. 5 illustrates a photo-sensor be disposed on the carriage.
Figure 6:
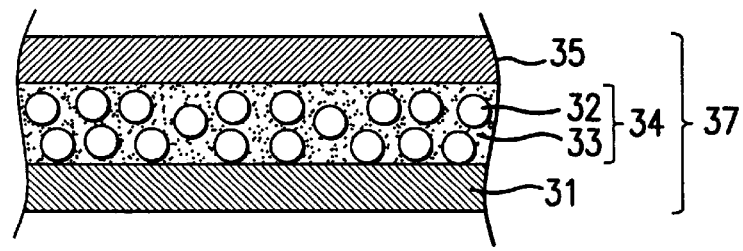
FIG. 6 is a side sectional view of a microcapsule sheet, illustrating the interior structure thereof.

The overall construction of a photosensitive and pressure-sensitive printer according to an embodiment of the image forming apparatus of the invention will first be described with reference to FIGS. 1 through 6. FIG. 1 is a side sectional view of a photosensitive and pressure-sensitive printer 80 before the light-proof cassettes 67A, 67B containing microcapsule sheets 37 that are photosensitive recording media, are attached to the printer 80. FIG. 2 is a plan view of the photosensitive and pressure-sensitive printer 80 shown in FIG. 1. FIG. 3 is a side sectional view of the photosensitive and pressure-sensitive printer 80 after the light-proof cassettes 67A, 67B are attached. FIG. 4 illustrates a carriage 48 mounted inside the photosensitive and pressure-sensitive printer 80. FIG. 5 illustrates a photo-sensor 63 disposed on the carriage 48. FIG. 6 is a side sectional view of a microcapsule sheet 37, illustrating the interior structure thereof.

Referring to FIGS. 1–3, the light-proof cassettes 67A, 67B can be detachably attached to a front portion of a casing 81 of the photosensitive and pressure-sensitive printer 80. Stacks of microcapsule sheets 37 that are not exposed to light are contained in the light-proof cassettes 67A, 67B. The microcapsule sheets 37 are stacked in such a placement that a light-transmitting support 31 (described below with reference to FIG. 6) of each microcapsule sheet 37, is positioned upward. In this embodiment, the microcapsule sheets 37 are provided in two sizes (3.5 inch×5 inch, and 4 inch×6 inch), and the light-proof cassettes 67A, 67B for containing the microcapsule sheets 37 of two different sizes, have correspondingly different widths and lengths but have the same height.

The light-proof cassettes 67A, 67B are inserted into an opening 81A of the casing 81. In this set state, microcapsule sheets 37 in each of the cassettes 67A and 67B can be picked up, one sheet at a time, from the top of the stack by a sheet feeding roller 65. The picked-up microcapsule sheet 37 is conveyed over a guide plate 86 toward an exposure table 66 by a first conveyance roller device 21 having an upper roller 21A and a lower roller 21B. The exposure table 66 faces an exposure head 20 provided as an exposure device for irradiating the microcapsule sheet 37 with light of a predetermined wavelength. The exposure table 66 is supported by the casing 81 so that the exposure table 66 can be moved toward and away from the exposure head 20. The exposure table 66 is pushed upward (toward the exposure head 20) by a spring member (not shown). The unexposed microcapsule sheet 37 drawn out of the light-proof cassette 67A or 67B is kept unexposed by a light-proof cover of the casing 81 and the like.

A sheet position sensor (not shown) for detecting a leading edge portion of a microcapsule sheet 37 is disposed upstream of the first conveyance roller device 21. Based on detection result, the exposure timing of reciprocating the exposure head 20 and the timing of the switch from the conveyance by the first conveyance roller device 21 to the conveyance by a second conveyance roller device 25 (as described below) are set. Width detection sensors 22A, 22B for detecting the size (width) of a microcapsule sheet 37 by detecting a side edge portion of the microcapsule sheet 37 are disposed in the microcapsule sheet conveyance path in parallel to each other, with a constant space left therebetween.

Detection signals from the width detection sensors 22A, 22B are input to a CPU 70, as described below.

Subsequently, it is determined, by a width detection device 70A, which of the two size types is the current microcapsule sheet 37. The width of the microcapsule sheet 37 is thus detected. Based on the detection result, the width of reciprocation of the exposure head 20 (carriage 48) is set by a reciprocation width changing device 70B. Then, the speed of conveyance of the microcapsule sheet 37 by the first conveyance roller device 21 and the second conveyance roller device 25 (intermittent conveyance device) and the speed of development of the microcapsule sheet 37 by a pressure development device 45 are changed by a speed changing device 70C.

The sheet feeding roller 65 and the upper roller (drive roller) 21A of the first conveyance roller device 21 are driven by a single drive motor (pulse motor) 23 so that each microcapsule sheet 37 is intermittently conveyed. More specifically, the sheet feeding roller 65 is rotated directly by the drive motor 23, and the upper roller 21A of the first conveyance roller device 21 is rotated by a driving force transmitted from the drive motor 23 by a gear mechanism 24. The upper roller 25A of the second conveyance roller device 25 is also rotated by the drive motor 23, through transmission by a similar gear mechanism 24, so that the second conveyance roller device 25 conveys each microcapsule sheet 37 at the same conveying speed as the first conveyance roller device 21.

A leading edge of each microcapsule sheet 37 conveyed by the first conveyance roller device 21 enters a gap between the downward-disposed exposure table 66 and the upward-disposed exposure head 20.

A surface of the exposure table 66 that contacts the microcapsule sheet 37 is provided with a pre-heater 64A that is formed by a film-shaped heater. The pre-heater 64A is used to heat the microcapsule sheet 37 to a predetermined temperature so as to improve the photo-sensitivity when a latent image corresponding to a red, green or blue image is to be formed within a selected range on the microcapsule sheet 37 by reciprocally scanning the exposure head 20 over the microcapsule sheet 37.

The exposure head 20 is disposed on a lower surface of the carriage 48 disposed above the exposure table 66 so as to be reciprocally movable in horizontal directions (direction X) perpendicular to the direction of width of the microcapsule sheet 37 (the microcapsule sheet conveying direction (direction Y)). The second conveyance roller device 25 having the upper and lower rollers 25A, 25B is disposed downstream of the carriage 48.

The pressure development device 45 having a pair of pressure development rollers 46A, 46B is disposed downstream of the second conveyance roller device 25, on the microcapsule sheet conveying path. Disposed downstream of the pressure development device 45 are a film-shaped post-heater 64B and a pair of discharge rollers 75, in that order. After being developed, the microcapsule sheet 37 is discharged out onto a sheet discharge portion 82 formed in an upper portion of the casing 81. The post-heater 64B heats the microcapsule sheet 37 after the development thereof is completed so that coloration of a color image has been achieved. The post-heater 64B thereby fixes the coloration. Both the post-heater 64B and the pre-heater 64A are formed by patterning an electrically conductive heating element on a thin film of polyimide or the like, by a printing method or the like, so that the film will generate heat when the electric current driving thereof is performed.

The lower rollers 21B, 25B of the first and second conveyance roller devices 21, 25 are provided with a switching device 27 for urging the lower rollers 21B, 25B alternately toward the upper lower 21A and 25A, respectively, by using plate spring members 26A, 26B. Therefore, the microcapsule sheet 37 is conveyed by only one of the first conveyance roller device 21 and the second conveyance roller device 25 at a time. More specifically, the plate spring members 26A, 26B have contact portions that contact the shaft portions of the lower rollers 21B, 25B, respectively, and are connected to a movable supporting member 30. Switching between the conveyance by the first conveyance roller device 21 and the conveyance by the second conveyance roller device 25 is performed by projecting or withdrawing the movable supporting member 30 using a solenoid device 28.

The movable supporting member 30 is pushed toward the first conveyance roller device 21 by a coil spring 29 so that when the solenoid device 28 is off, the movable supporting member 30 is moved toward the first conveyance roller device 21 by the spring force of the coil spring 29 and, therefore, the force of the plate spring member 26A pushing the lower roller 21B of the first conveyance roller device 21 upward (toward the upper roller 21A) becomes greater than the force of the plate spring member 26B pushing the lower roller 25B of the second conveyance roller device 25 upward. When the solenoid device 28 is on, the movable supporting member 30 is moved toward the second conveyance roller device 25 and, therefore, the force of the plate spring member 26B pushing the lower roller 25B of the second conveyance roller device 25 upward becomes greater than the force of the plate spring member 26A pushing the lower roller 21B of the first conveyance roller device 21 upward.

It is possible to adjust the pushing force of the plate spring members 26A, 26B so as to adjust the contact pressure of the lower rollers 21B, 25B onto the upper rollers 21A, 25A within the range of 0 to 50 g, by appropriately selecting the strength, mounting angle, and the like, of the plate spring members 26A, 26B. Furthermore, the solenoid device 28 does not need to actually have a solenoid, but may be any device that is able to move the movable supporting member 30 in a switching manner, as described above. For example, an air cylinder, a linear motor, or the like, may be used as the solenoid device 28.

The carriage 48 is slidably supported by a pair of guide shafts 49 fixed inside the casing 81 as shown in FIGS. 1–3. The guide shafts 49 have a cylindrical shape and extend parallel to each other in a direction perpendicular to the plane of the sheet in FIGS. 1 and 3. The exposure head 20 is fixed to the lower surface of the carriage 48, that is, the surface facing the exposure table 66. A downstream end portion of the carriage 48 is fixed to a timing belt 53 that is disposed on two pulleys 51, 52. One pulley 51 of the two is connected to a carriage driving motor 54. Therefore, by operating the timing belt 53 through the carriage driving motor 54, the carriage 48 is reciprocated along the guide shafts 49.

The carriage driving motor 54 is designed so that the direction and amount of rotation thereof can be controlled. A normal DC/AC motor may be used as the carriage driving motor 54. As illustrated in FIGS. 4 and 5, a position detection device is substantially made up of a linear encoder 62 formed by a transparent film of polyethylene terephthalate (PET) which extends in the direction of movements of the carriage 48 and on which black transverse stripes 62a are printed, and a photo-sensor 63 (for example, a transmission photo-interrupter) provided on the carriage 48 for detecting the position of the carriage 48 by using the linear encoder 62.

The amount of scan of the carriage 48 can be calculated by counting transverse stripes 62a of the linear encoder 62 using the photo-sensor 63. On the basis of a signal from the position detection device, the carriage driving motor 54 is controlled and the width of reciprocal scan of the carriage 48 is calculated.

In FIG. 4, L1 indicates the amount of scan for the smaller microcapsule sheet 37 (3.5 inch×5 inch), and L2 indicates the amount of scan for the larger microcapsule sheet 37 (4 inch×6 inch). Instead of employing a DC/AC motor, the carriage driving motor 54 may employ a pulse motor of open loop control type. In such a case, the position detection device may be omitted.

After passing through the second conveyance roller device 25, the microcapsule sheet 37 is conveyed to the pressure development device 45, guided by a guide member 83. During an initial period in this conveyance, the microcapsule sheet 37 does not move along the guide member 83, that is, it is not precisely directed to the pressure development device 45 (as indicated by a dot-dash line in FIG. 3), due to its own rigidity. However, as the microcapsule sheet 37 is intermittently conveyed further by the second conveyance roller device 25, the microcapsule sheet 37 is gradually curved along the guide member 83, and then conveyed to the development device 45, where the microcapsule sheet 37 is subjected to pressurized development. That is, a buffer portion 84 is provided between the second conveyance roller device 25 and the development device 45, for temporarily stopping the advancement of the microcapsule sheet 37 and thereby accumulating a predetermined amount (length) of the microcapsule sheet 37 so as to achieve smooth transition from the intermittent conveyance by the second conveyance roller device 25 to the continuous conveyance by the development device 45.

Of the pressure development rollers 46A, 46B, one roller 46A is rotatably supported by the casing 81, and the other roller 46B is rotatably supported by one end portion of a supporting bracket 55 having a rotating shaft 55A. A second end portion of the supporting bracket 55 has a lower cam surface 55B that contacts a cam 56. A pressurizing member 57 is disposed above the second end portion of the supporting bracket 55. The pressurizing member 57 is pushed downward by a spring member 58 so that the lower cam surface 55B always remains in contact with the cam 56.

The pressure development rollers 46A, 46B are linear contact-type pressurizing rollers that are positioned rotatably about an axis perpendicular to the direction of conveyance of the microcapsule sheet 37. The pressure development roller 46B is pushed by the spring force of the spring member 58 so as to contact the pressure development roller 46A. The pressure development roller 46A is rotated by a driving force transmitted by a gear mechanism 61 from a drive motor 60 that is disposed at a side of the casing 81 opposite from the side at which the carriage driving motor 54 is disposed.

As for the force exerted by the pressure development rollers 46A, 46B to pressurize the microcapsule sheet 37, it is also possible to use a pressurizing device such as a pneumatic device, a hydraulic device, a solenoid, or the like, instead of using the spring force of the spring member 58. It is also possible to utilize electromagnetic force for the pressurization, in place of or in addition to the use of an elastic element. That is, any device may be used for the pressurization as long as the device makes it possible to push one of the pressure development rollers to the other (that is, clamp the microcapsule sheet 37).

The structure of each microcapsule sheet 37 will be described with reference to the sectional view shown in FIG. 6. In the microcapsule sheet 37, a mixture layer 34 is formed on the light-transmitting support 31, which comes to the bottom side when the microcapsule sheet 37 is placed in the cassette. The mixture layer 34 is formed by applying a mixture of microcapsules 32 containing a component that produces a color when it contacts a co-reactant provided as a coloring material (the component may be termed dye precursor, and it is sometimes referred to as "chromogen" hereinafter) and a component (photo-setting resin) that changes its mechanical strength (that is, undergoes photo-setting in this embodiment) when exposed to light of a predetermined wavelength, and a co-reactant (color developer) 33 capable of reacting with the dye precursor (chromogen) from the microcapsules 32. A sheet-shaped support 35 is formed on the mixture layer 34.

As for the microcapsules 32, three different types of microcapsules are contained. Each type of microcapsule contains a colorless dye precursor for developing one of yellow, magenta and cyan, a photo-setting resin that hardens when exposed to light of a wavelength corresponding to one of the three primary colors of light, and a polymerization initiator.

Therefore, when the microcapsule sheet 37 is exposed to blue light (having a wavelength of about 470 nm), the photo-setting resin in the microcapsules 32 containing the yellow dye precursor hardens. When a pressure is applied to the microcapsule sheet 37, the microcapsules that underwent photo-setting (the microcapsules containing the yellow dye precursor) are not destroyed, but the microcapsules that did not undergo photo-setting (the magenta and cyan dye precursor-containing microcapsules) are destroyed. Therefore, the magenta dye precursor and the cyan dye precursor flow out of the microcapsules and react with the color developer to produce colors, which mix into blue. The-thus produced blue color is visible through the light-transmitting support 31.

When the microcapsule sheet 37 is exposed to green light (having a wavelength of about 525 nm), the photo-setting resin in the microcapsules 32 containing the magenta dye precursor hardens. When a pressure is applied to the microcapsule sheet 37 (or pressurized development is performed), the microcapsules 32 containing the yellow dye precursor and the cyan dye precursor are destroyed, so that the yellow dye precursor and the cyan dye precursor react with the color developer to produce colors, which mix into green. The thus-produced green color is visible through the light-transmitting support 31.

When the microcapsule sheet 37 is exposed to red light (having a wavelength of about 650 nm), the photo-setting resin in the microcapsules 32 containing the cyan dye precursor hardens. When a pressure is applied to the microcapsule sheet 37 (or pressurized development is performed), the microcapsules 32 containing the yellow dye precursor and the magenta dye precursor are destroyed, so that the yellow dye precursor and the magenta dye precursor react with the color developer to produce colors, which mix into red. The thus-produced red color is visible through the light-transmitting support 31.

When photo-setting occurs on all the types of microcapsules 32 through exposure to light, the microcapsules 32 are not destroyed despite the pressurized development process. Therefore, no color development occurs, and the internal surface of the sheet-shaped support 35 is visible through the light-transmitting support 31. That is, the white surface of the sheet-shaped support 35 becomes the background color, and the portions that underwent color developing reactions form a color image. This color development principle is termed "self-coloration". The internal surface of the light-transmitting support 31 of the microcapsule sheet 37 is termed "coloring surface". In this embodiment, the light-transmitting support 31 is formed by a resin film of, for example, polyethylene terephthalate (PET), polyvinyl chloride and the like.

Sensitive members containing the microcapsules 32, or the like, are considerably affected by humidity. If the sensitive member (microcapsule sheet 37) is stored under a highly humid condition, the light-transmitting support 31 and the sheet-shaped support 35 absorb moisture, resulting in considerable fluctuation in sensitivity. More specifically, although moisture absorption increases the sensitivity, the sensitivity can increase 10-fold or greater depending on the humidity condition during high-humidity storage. In image forming apparatuses that expose a sensitive member to light at a constant energy density from a plurality of light sources as in the invention, sensitivity-fluctuating factors become a critical problem in maintaining a high image quality.

In order to eliminate this problem, it is desirable to select moisture-proof materials for the light-transmitting support 31 and the sheet-shaped support 35 or to apply a moisture-proof material on the outer surface or inner surface (a surface facing the microcapsules 32). Examples of the moisture-proof material include a wide variety of optical lens materials, such as amorphous polyolefins and the like. In the case where a moisture-proof material is applied to the surface, the vapor deposition of $SiO_2$, for example, may be performed.

Another technical problem is that when the microcapsules 32 are exposed to radiation of ultraviolet rays through the light-transmitting support 31, the microcapsules 32 become yellowish, so that the chromaticity and density of the white base color changes. In order to eliminate this problem, it is desirable to select a material having a low ultraviolet transmittance for the light-transmitting support 31 and/or to apply a material having a low ultraviolet transmittance to the outer or inner surface of the light-transmitting support 31.

Still another problem is that incident light for image exposure is scattered by the microcapsules 32 and the sheet-shaped support 35, and multiple reflection in horizontal directions occurs at the light-transmitting support 31, so that light diffuses and the resolution achieved by the sensitive member considerably decreases. In order to eliminate this problem, the horizontal diffusion may be reduced by limiting the thickness of the light-transmitting support 31 to a certain thickness or less. In an example where the thickness of the light-transmitting support 31 was 75 $\mu$m, the resolution of the sensitive member at MTF=0.5 was 127 dpi. In another example where the thickness of the light-transmitting support 31 was 40 $\mu$m, the resolution of the sensitive member at MTF=0.5 was 200 dpi.

As the microcapsules 32, known microcapsules may be used in which a polymer wall formed from gelatin, polyamide, polyvinyl alcohol, polycyanate resin or the like contains a chromogen, such as a triphenylmethane-based dye, a spiropyran-based dye, or the like, a photo-setting resin, such as an acryloyl-containing compound, e.g., a trimethylolpropane triacrylate, a photo-polymerization initiator such as benzophenon or benzoyl alkyl ether, and the like.

The co-reactant 33 may be any of the known color developers that include acidic substances, for example, acidic clay, kaolin, acidic zinc, inorganic oxides such as titanium oxide, phenolic novolac resins, organic acids, and the like, depending on the composition, etc., of the chromogen contained in the microcapsules 32.

The mixture layer 34 is formed by adding a binder, a filler, a viscosity adjusting agent, and the like, to the mixture of the microcapsules 32 and the co-reactant 33, and applying the mixture onto the light-transmitting support 31 by using an applying roller, a spray, a doctor knife, or the like.

The sheet-shaped support 35 may be a transparent, semi-transparent or opaque support formed from, for example, paper (cellulose), synthetic paper, a resin film of polyester, polycarbonate or the like. The countermeasures for humidity and ultraviolet radiation are provided as described above.

Figure 7:
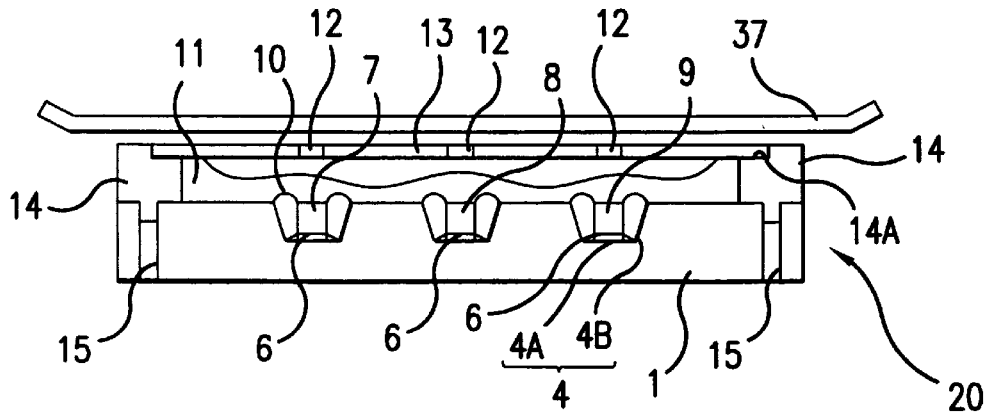
FIG. 7 is a side sectional view of the internal construction of an exposure head.
Figure 8:
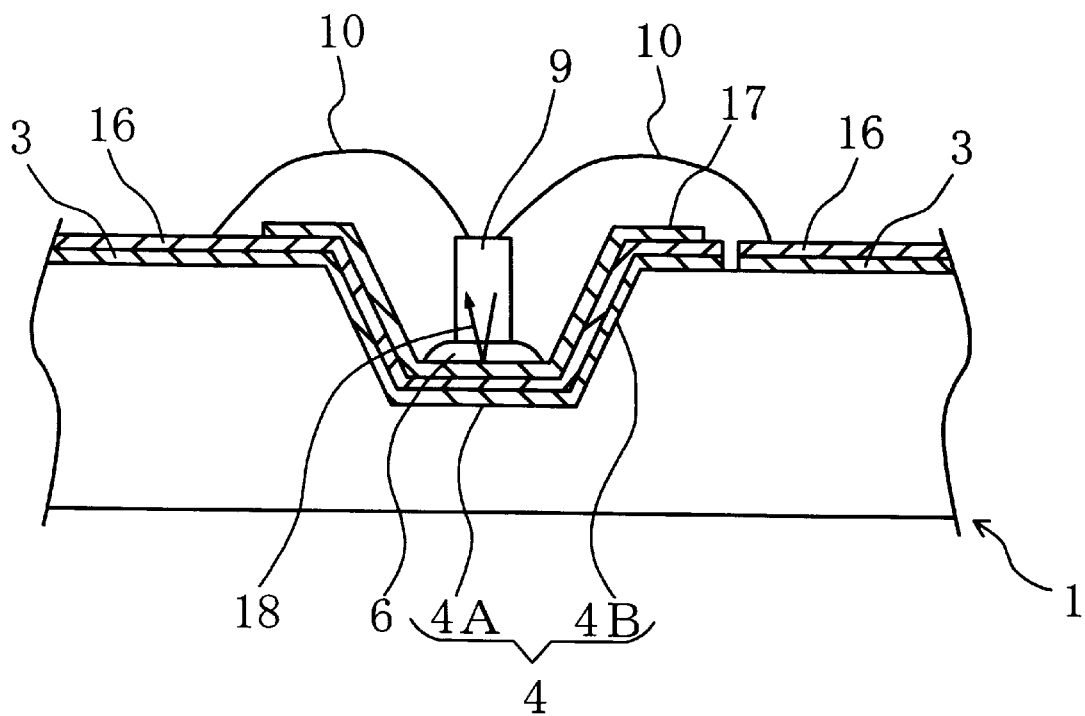
FIG. 8 is an enlarged sectional view of a portion around a light-emitting element provided in the exposure head.
Figure 9:
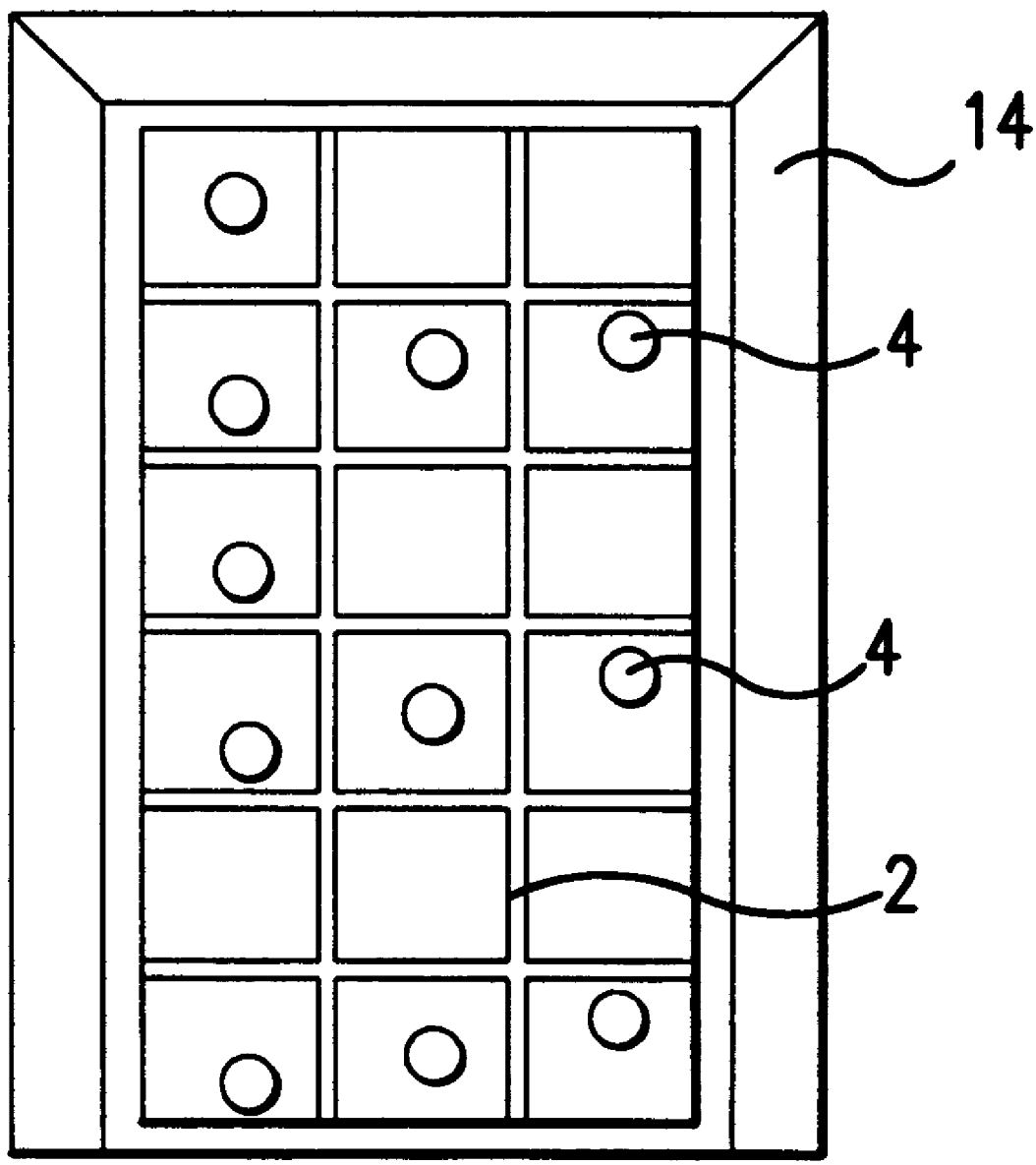
FIG. 9 is a plan view of a mask retaining member attached to the exposure head.
Figure 10:
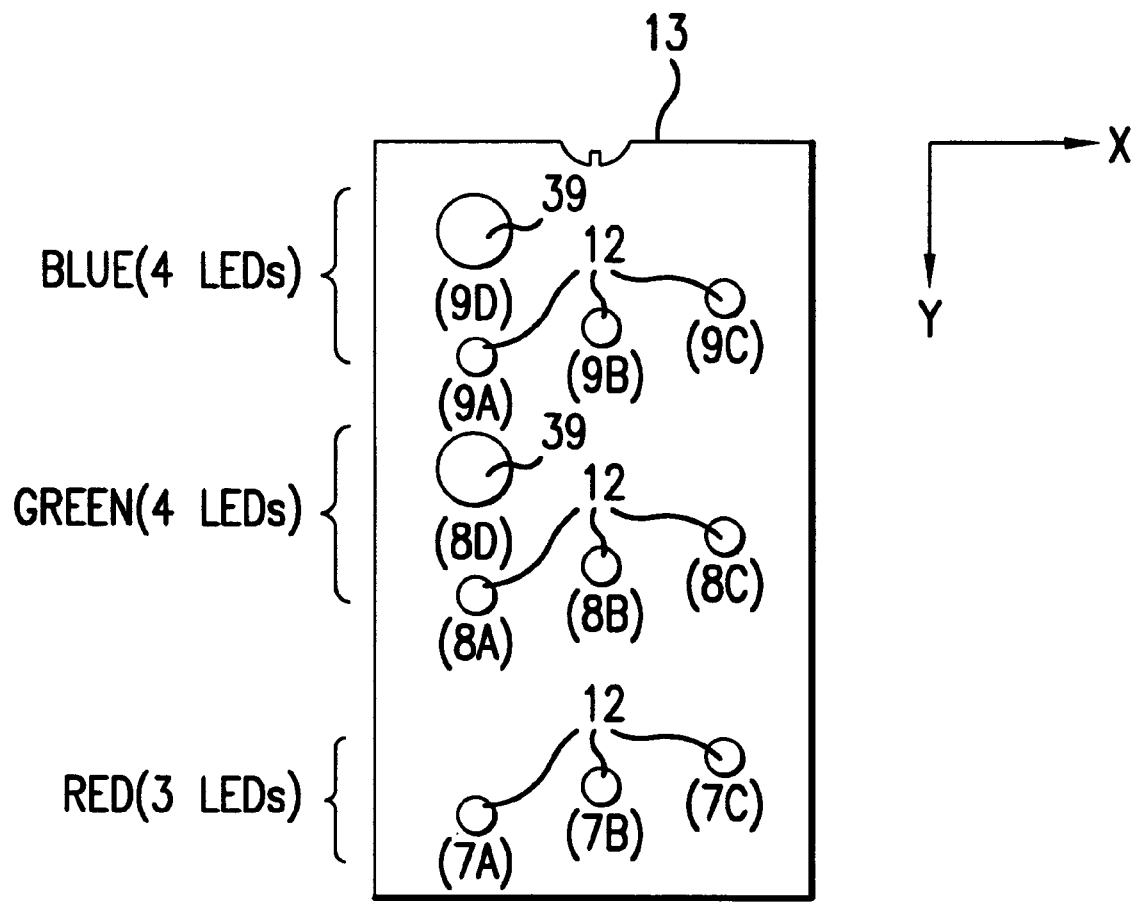
FIG. 10 is a plan view of a mask attached to the exposure head.
Figure 11:
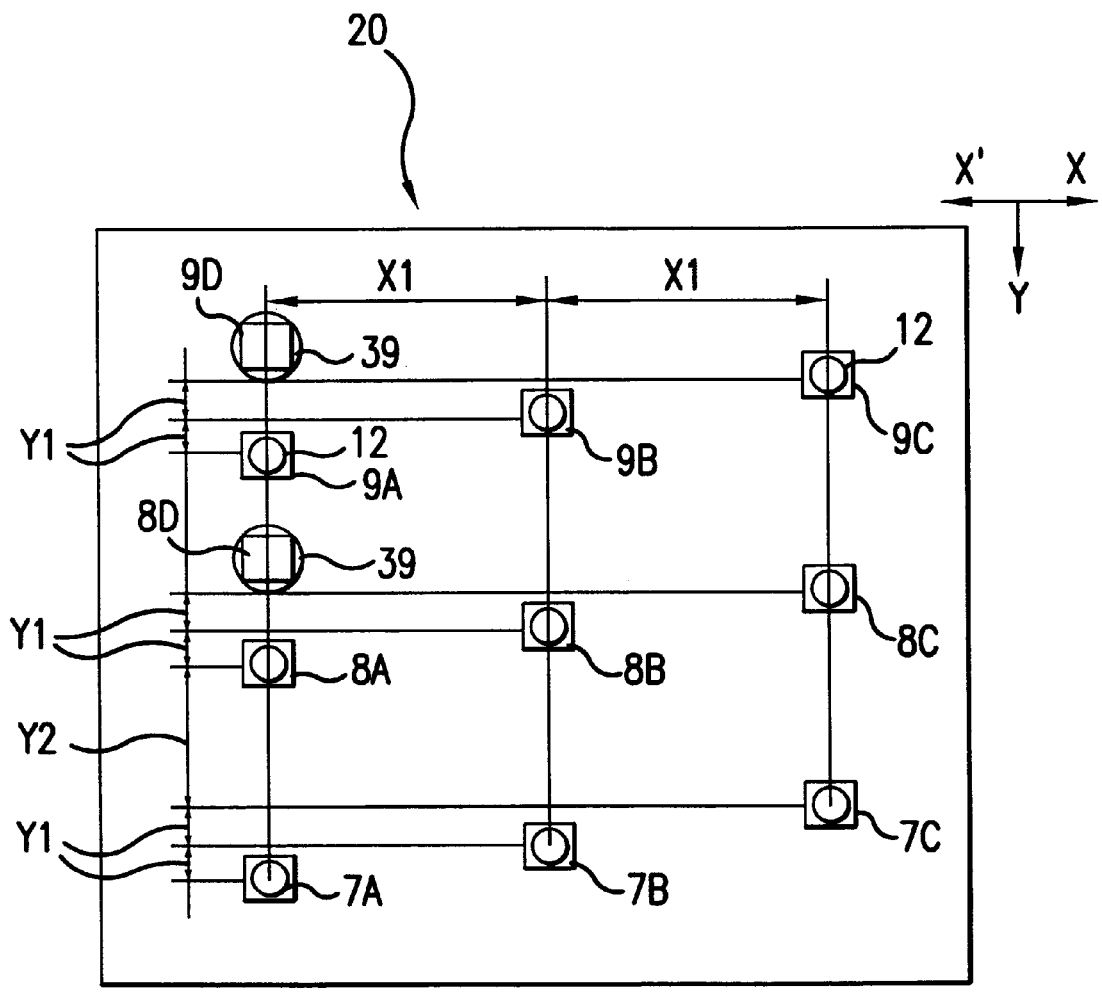
FIG. 11 illustrates the arrangement of light-emitting elements (light-emitting diodes) in the exposure head.

The construction and operation of the exposure head 20, that is, the exposure device, will be described with reference to FIGS. 7–11. FIG. 7 is a side sectional view of the internal construction of the exposure head 20. FIG. 8 is an enlarged sectional view of a portion around a light emitting element 9 (7, 8) provided in the exposure head 20. FIG. 9 is a plan view of a mask retaining member 14 attached to the exposure head 20. FIG. 10 is a plan view of a mask 13 attached to the exposure head 20. FIG. 11 illustrates the arrangement of light emitting elements (light emitting diodes) 7, 8, 9 in the exposure head 20.

The exposure head 20 includes, as shown in FIG. 7, a plurality of kinds of light emitting elements 7, 8, 9, a base board 1 provided as a base for supporting (fixing) the light emitting elements 7, 8, 9, the mask 13, and the mask retaining member 14. As shown in FIG. 8, cup-shaped recesses 4 are formed on a surface of the base board 1 formed by a flat plate of glass epoxy, by a cutting process, a pressing process, or the like. An electrode layer 3 for conducting electric signals is formed on the surface of the base board 1 by electroless plating. The electrode layer 3 has a land pattern in a plan view. The electrode layer 3 is formed by a copper foil having a thickness of 35 $\mu$m. Thin-film bonding pads 16 for connecting bonding wires 10 are formed on the surface of the electrode layer 3. The bonding pads 16 are formed by a nickel film of 5 $\mu$m in thickness and a gold film of 0.5–1.0 $\mu$m in thickness. Furthermore, in this embodiment, a reflecting aluminum layer 17 having a thickness of 5 $\mu$m is formed as a reflecting member by vacuum vapor deposition on a surface below each light-emitting element 9 (7, 8), the surface being out of the bonding areas.

In short, a required number of the recesses 4 are formed at predetermined positions on the base board 1, and the electrode layer 3 of a predetermined pattern is formed. Furthermore, the bonding pads 16 are formed on the electrode layer 3. The reflecting aluminum layer 17 is formed in and around each recess 4. Thus, a four-layer structure is formed. In each recess 4, a light emitting diode (LED) forming the light-emitting element 9 (7, 8) is fixed by silver paste or an epoxy-based adhesive 6.

In a conventional structure, the reflecting aluminum layer 17 is not provided below each light-emitting element 9 (7, 8), but the thin-film bonding pads 16 serve as a reflecting layer. However, the conventional structure has a low reflectivity so that the output power of the blue light-emitting element 9 may be reduced. Since the reflectivity of gold to blue light (represented by a wavelength of 450 nm) with respect to a regular reflection component is 38.7%, part of the blue light generated in the light-emitting element 9 by performing current driving travels to the surface of adhesion with the base board 1 and is reflected from the adhered surface as indicated by arrow 18. Since the adhered surface is gold, the reflection on the adhered surface is accompanied by absorption of 60% or more of the power from the light-emitting element 9, that is, such an amount of light is not reflected back into the light-emitting element 9.

To solve this problem, the image forming apparatus according to this embodiment employs the reflecting layer 17, and selects aluminum as a material thereof, and adopts vacuum vapor deposition as a method for forming the reflecting aluminum layer 17, so that the emission power from each blue light-emitting element 9 can be considerably increased. More specifically, the reflectivity of aluminum to blue light (represented by a wavelength of 450 nm) with respect to the regular reflection component is 92.2%, which is about 2.4 times the reflectivity of gold. Therefore, part of the blue light generated in each light-emitting element 9 by current driving travels to the surface of adhesion with the base board 1, and it is substantially entirely reflected from the reflecting aluminum layer 17 without significant absorption, so that most of the blue light generated in each light-emitting element 9 is directed toward the microcapsule sheet 37. Consequently, the power of light emitted from each blue light-emitting element 9 provided in the exposure head 20 can be considerably increased.

The advantage of considerable increase of the power of emission light also provides the following advantages. The number of light-emitting elements 9 required on the exposure head 20 can be reduced, thereby significantly contributing to volume reduction of the apparatus and cost reduction. Furthermore, the drive current for each light-emitting element 9 to produce a required power, can be reduced.

In an example of the invention wherein LEDs by Nichia Kagaku (Model NSCM100) were used as the blue light-emitting elements 9, the radiant intensity of the light-emitting elements 9 on a gold thin film in the vertical direction was 0.49 mW/sr under conditions of a drive current of 20 mA and a normal temperature, whereas the radiant intensity of the light-emitting elements 9 on the reflecting aluminum layer 17 in the vertical direction under the same conditions was 0.67 mW/sr, that is, 1.36 times the blue light emission power from the light-emitting element 9 on the gold thin film.

That is, the advantage of the invention was achieved by increasing the reflectivity of the reflecting member to blue light regarding the regular reflection component by about 50% by using an appropriate material to form the reflecting member. The material of the reflecting member is not limited to aluminum but may be various other materials, for example, nickel, chrome, silver and the like. The material is not limited to metal, but may be a dielectric thin film formed on the reflecting surface. The reflecting member may also be formed by applying a material that meets the aforementioned reflection requirement onto an electrically insulating film. The method for forming the reflecting member is not limited to vapor deposition, but may be various other methods, for example, etching, sputtering, print-applying, coating, and the like.

The construction of the exposure head 20 will be further described. The recesses 4 are formed into a sectional cup shape, as illustrated in detail in FIG. 8. A bottom surface 4A of each recess 4 is parallel to the surface of the base board 1, and an inclined side surface 4B extends upward from the bottom surface 4A so that the space defined by the side surface 4B expands as the distance from the bottom surface 4A increases. The electrode layer 3 is formed in a predetermined pattern, extending along the inner surfaces of each recess 4.

A red LED 7, a green LED 8 or a blue LED 9 is fixed to the surface of the electrode layer 3 at the bottom surface 4A of each recess 4, by using the adhesive 6, as shown in FIG. 7. The depth of the recesses 4 is slightly greater than the mount height of the red LEDs 7, the green LEDs 8 and the blue LEDs 9, so that the top of each of the red, green and blue LEDs 7, 8, 9 is slightly receded from the plane of the surface of the base board 1. The top of each of the red, green and blue LEDs 7, 8, 9 is electrically connected to predetermined positions on the bonding pad 16 by the bonding wires 10. The bonding wires 10 of the red, green and blue LEDs 7, 8, 9 are sealed by a transparent seal 11 so as to prevent contact of the bonding wires 10 with the air.

As for the adhesive 6, a silver paste is used for the red LEDs 7, and an epoxy resin, or the like, is used for the green LEDs 8 and the blue LEDs 9. Since the bottom surface of each red LED 7 functions as an electrical terminal, it is necessary to electrically connect the LED bottom surface to the base board 1 by the adhesive 6. On the other hand, since both electrical terminals of each of the green LEDs 8 and the blue LEDs 9 are disposed on its top, an electrically insulating transparent epoxy resin is used to adhere the green and blue LEDs 8, 9 to the bottom surfaces of the recesses 4. The use of the transparent adhesive achieves an advantage that part of light generated in each of the green and blue LEDs 8, 9 travels to the bottom surface 4A of the corresponding recess 4 through the transparent adhesive 6, and it is reflected therefrom and then emitted from the top of the LED, so that the amount of light emitted increases.

The red LEDs 7 are formed basically from AlGaAs. Known DDH-structure red LEDs with high output power may be used. The central wavelength of output light is about 650 nm. One of the electric terminals of each red LED 7 is provided on the top surface, and the other on the bottom surface. The green LEDs 8 and the blue LEDs 9 may be formed basically from GaN. The central wavelengths of the green LEDs 8 and the blue LEDs 9 are about 525 nm and about 470 nm, respectively. Two electrical terminals of each of the green LEDs 8 and the blue LEDs 9 are provided on the top surface thereof, and no electrical terminal is provided on the bottom surface. Each LED emits light in all directions when a predetermined current is supplied between the two terminals in a predetermined direction. A portion of the output light emitted in all directions from each LED travels upward in FIG. 7, and another portion thereof also travels upward after being reflected from the side surface 4B of the recess 4.

The bonding wires 10 are formed by gold wires. The bonding wires 10 are bonded to the bonding pads 16 formed on the electrode layer 3, by heating and ultrasonic processing.

The seal 11 is formed by a thermosetting resin. Normally, transparent silicone resin, epoxy resin, and the like, are used for the seal 11. The thermosetting is performed normally at a temperature of 150° C. for about 4 hours. Ordinary semiconductors, such as those for LEDs, are subject to surface oxidation, moisture absorption, and the like, when in contact with air, so that characteristics sharply deteriorate. Therefore, the seal 11 serves to prevent contact with air and to protect the bonding wires 10, and the like, from mechanical impacts and therefore prevent breakage. Furthermore, in this embodiment, the seal 11 is also used to adhere and fix the mask 13 and the mask retaining member 14.

The mask 13 has a plurality of pin holes 12 (equal to the number of light emitting elements) that extend through the mask 13 and have a circular opening shape. The mask 13 is positioned above the base board 1 by using the mask retaining member 14 therebetween. The mask retaining member 14 is fixed to the base board 1 by using positioning boss holes 15. A mask positioning groove 14A extends in an upper end surface of the mask retaining member 14. The mask 13 is fitted to the positioning groove 14A. The mask 13, the mask retaining member 14 and the base board 1 are integrally fixed by using an adhesive or other fixing measures. In this embodiment, the mask 13 and the mask retaining member 14 are firmly fixed to the base board 1 by the seal 11.

As shown in FIG. 9, the mask retaining member 14 has integral partition walls (separating walls) 2 that separate the recesses 1 on the base board 1 from one another. The lower end surface of the partition walls 2 contacts the upper surface of non-recess areas (flat areas) of the base board 1 (including the upper surface of the electrode layer 3). The upper end surface of the partition walls 2 contacts the lower surface of the mask 13. Therefore, a light-propagating space between the base board 1 and the mask 13 is divided into spaces for the individual light emitting elements (LEDs). That is, because of the partition walls 2 surrounding and separating each recess 4, a light flux emitted from the LED disposed in a recess 4 goes out through only the pin hole 12 formed in a portion of the mask 13 that faces the recess 4, and does not go out through any of the pin holes 12 corresponding to the other recesses 4. Consequently, stray light is prevented, so that a high-resolution image can be formed.

The mask retaining member 14 is a single molding of a high-precision heat-resistant plastic. The mask retaining member 14 defines the position of the mask 13 in the directions of the three axes thereof, on the basis of the positioning boss holes 15 formed in the base board 1. Furthermore, the partition walls 2 of the mask retaining member 14 confine the output light from each light emitting element (LED) within the corresponding space separated from the other spaces by the partition walls 2, so as to eliminate the problem of stray light traveling from an LED through a pin hole 12 that is adjacent but not corresponding to the LED. If the seal 11 formed of a thermosetting resin is used to simultaneously position and fix the mask retaining member 14 and the mask 13, it is necessary to use a heat-resistant material to form the mask retaining member 14 so that the mask retaining member 14 will not deform even at the hardening temperature of the seal 11. Such a heat resistant material may be POM, or the like. The mask retaining member 14 having the partition walls 2 constitutes an optical separation device.

It is also possible to provide a mask retaining member separate from partition walls. It is also possible to provide partition walls as integral portions of the base board 1. Further, it is possible to employ a mask with integral partition walls. In addition, the shape of separate spaces is not limited to a square or a rectangle, but may be a circular shape or other various shapes.

As shown in FIG. 10, the mask 13 is formed of a stainless steel plate having a thickness of about 0.1 mm. The outline and the pin holes 12 and auxiliary pin holes 39 of the mask 13 are formed by etching. The surfaces of the mask 13 are colored black by a dipping process, thereby preventing light reflection. However, the light reflection preventing process can be omitted without causing a significant problem, since the exposure head 20 of this embodiment has the optical separation device and therefore solves the problem of stray light to and from adjacent light sources.

The pin holes 12 have a diameter of about 0.2 mm to about 0.18 mm. The diameter of the pin holes 12 determines a resolution of a light pattern that is produced on the microcapsule sheet 37, that is, a photosensitive recording medium. The auxiliary pin holes 39 have a diameter of about 0.4 mm, that is, about twice the diameter of the pin holes 12. The auxiliary pin holes 39 are used for auxiliary exposure, as described below. The pin holes 12 are formed corresponding one-to-one to the top portions of the red, green and blue LEDs 7, 8, 9.

In this embodiment, a set of three red LEDs 7A, 7B, 7C, a set of three green LEDs 8A, 8B, 8C and a set of three blue LEDs 9A, 9B, 9C are arranged for image modulation exposure in that order from a front to a rear of the mask 13 in the sheet conveying direction, as indicated in FIG. 10. Another green LED 8D and another blue LED 9D are separately disposed as light emitting elements for auxiliary exposure that is performed independently of image modulation (wherein the on-off control of the individual red, green and blue LEDs is performed in accordance with image data so as to form a desired image). In FIG. 10, reference characters 7A–7C, 8A–8D and 9A–9D in parentheses indicate the positions of the individual LEDs.

As for green light and blue light, there is a range of exposure energy density in which the density of an output image remains unchanged (range in which the photosensitive resin in the microcapsules 32 does not harden). In an example using a microcapsule sheet, the exposure of the photosensitive member to $\frac{1}{5}$ of the exposure energy density necessary for the maximum image density change did not change the image density in the photosensitive member. Therefore, by irradiating a microcapsule sheet 37 with $\frac{1}{5}$ of the green and blue light energy density required for the maximum image density change independently of the image modulation exposure, it becomes possible to reduce the number of LEDs used.

A red LED for auxiliary exposure is not provided, because the range exposure energy density regarding the red light-sensitive microcapsules where the density of the output image remains unchanged, is sufficiently lower than the ranges regarding blue and green light-sensitive microcapsules. That is, as for red light, the range of exposure energy density in which the density of an output image remains unchanged is as low as about $\frac{1}{20}$ of the exposure energy density required for the maximum image density change.

In this embodiment, the LEDs 7, 8, 9 are arranged in the form of a matrix. Image modulation exposure of one dot (pixel) is performed three times for each color, by using the three LEDs of each set arranged obliquely to the scanning direction. Each of the three LEDs of each set emits light to expose one exposure line every time the sheet has been intermittently conveyed by an amount corresponding to one exposure line. Therefore, one pixel is exposed three times for each color, that is, nine times in total.

The red, green and blue LEDs 7, 8, 9 for image modulation exposure are arranged as illustrated in FIG. 11. In the set of the three red LEDs 7A, 7B, 7C arranged in the direction X (direction of reciprocal movements of the exposure head 20), the interval X1 between the LED 7A and the LED 7B and the interval X1 between the LED 7B and the LED 7C in the direction X, are set to an integer multiple of the size of a pixel (dot) formed on the microcapsule sheet 37 (for example, 16 times the pixel size). The interval Y1 between the LED 7A and the LED 7B and the interval Y1 between the LED 7B and the LED 7C in the direction Y (the direction of conveyance of the microcapsule sheet 37) are set to the size of a pixel (dot) formed on the microcapsule sheet 37 or an integer multiple of the pixel size. The other red LEDs are similarly arranged in sets of three LEDs arranged in the direction X.

The interval in the direction Y between the set of three LEDs arranged in the direction X, and the adjacent set of three LEDs arranged in the direction X is set to the distance equal to 16 dots (in the direction Y). That is, in FIG. 11, Y2+Y1+Y1=16 dots and, therefore, Y2=14 dots. The three green LEDs 8A, 8B, 8C and the three blue LEDs 9A, 9B, 9C are arranged substantially in the same manner as the three red LEDs 7A, 7B, 7C.

That is, the interval between the set of the red LEDs 7 (the set of three LEDs arranged in the direction X and illustrated at the bottom in FIG. 11), and the set of the green LEDs 8 (the set of three LEDs arranged in the direction X and illustrated in the middle in FIG. 11) is set to a distance equal to 16 dots in the direction Y. Similarly, the interval between the set of the green LEDs 8 (the set of three LEDs arranged in the direction X and illustrated in the middle in FIG. 11) and the set of the blue LEDs 9 (the set of three LEDs arranged in the direction X and illustrated at the top in FIG. 11), is set to a distance equal to 16 dots in the direction Y.

Therefore, in FIG. 11, the interval between the red LED 7A and the blue LED 9A is equal to 16×2=32 pixels. In this manner, the interval between LEDs of different colors is shifted from an integer multiple of the number of LEDs of each color (three LEDs in the embodiment), so that if an error in sheet conveyance or the like occurs in a cycle of three exposure lines, a transverse error line or strip will not become manifest.

The arrangement of the pin holes 12 formed in the mask 13 is determined so as to conform to the arrangement of the LEDs.

For exposure of a desired image, the exposure head 20 having the above-described construction is moved at a predetermined speed V in a horizontal direction in FIG. 2 (directions X in FIG. 11), for example, the direction +X, while modulation exposure using the LEDs corresponding to the image data are being performed. After the microcapsule sheet 37 is conveyed by the amount of one exposure line in a vertical direction in FIG. 2 (direction Y in FIG. 11), the exposure head 20 is moved in the direction −X at the predetermined speed V while modulation exposure is being performed. Subsequently, after the microcapsule sheet 37 is conveyed by the amount of one exposure line in the direction Y, the exposure head 20 is moved in the direction +X while modulation exposure using the corresponding LEDs are being performed. The process as described above is repeated for nine exposure lines at a time, thereby exposing the microcapsule sheet 37 to a desired image.

By performing the modulation exposure driving of each LED in accordance with image information independently of the other LEDs while scanning the exposure head 20 in the manner described above, light having a predetermined central wavelength is supplied to a predetermined location at a predetermined power for a predetermined length of time so that a latent color image can be formed.

The movements of the carriage 48 will be described with reference to FIG. 12, which is a graph indicating changes in the moving (scanning) speed of the carriage 48 over time. The carriage 48 is reciprocally moved by driving the carriage driving motor 54 (servo motor) and the like in a trapezoidal speed change pattern with a maximum constant scanning speed of V=500 mm/sec, a scanning period of T=456 msec (228 msec in one direction) and a constant speed time of Tc=178 msec in the case of the microcapsule sheet 37 of 3.5 inches in width. In the case of the microcapsule sheet 37 of 4 inches in width, the carriage 48 is reciprocally moved in a trapezoidal speed change pattern with a maximum constant scanning speed of V=500 mm/sec, a scanning period of T=506 msec (253 msec in one direction) and a constant speed time of Tc=203 msec.

Figure 12:
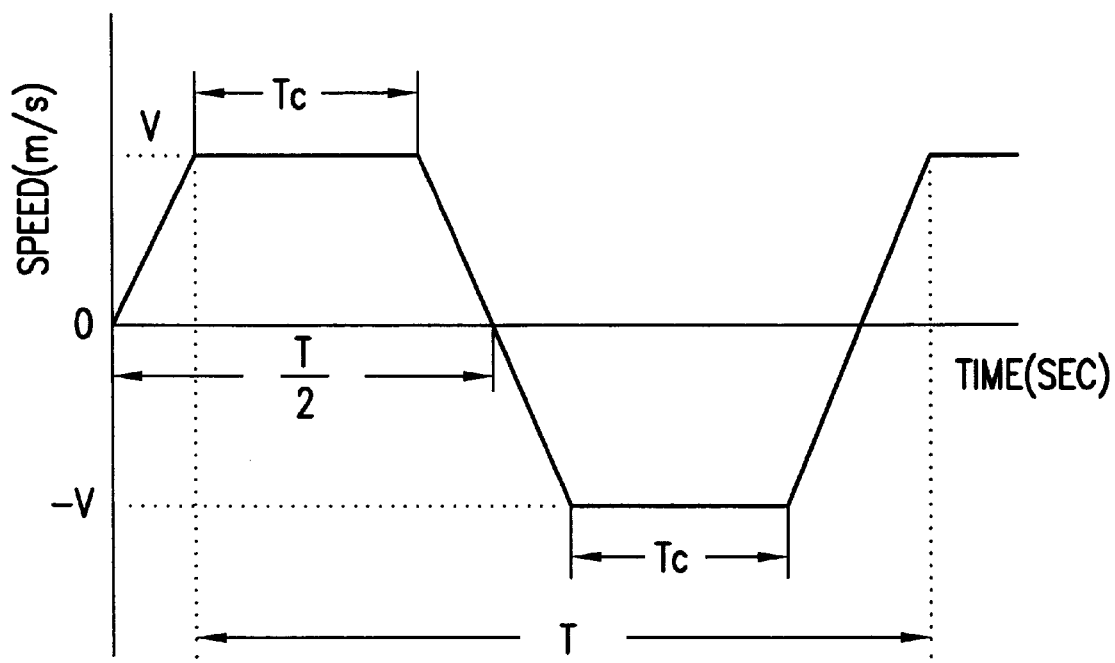
FIG. 12 is a graph indicating changes in the moving (scanning) speed of the carriage 48 over time.

That is, the carriage 48 is reciprocally moved (reciprocally scanned) in the directions of width of the microcapsule sheet 37 (directions X) at the maximum constant scanning speed ±V (mm/sec) as indicated in FIG. 12. In the graph of FIG. 12, line segments inclined relative to the time axis (abscissa axis) indicates accelerating and decelerating ranges between a temporary stop (standby) at an end of the reciprocal passage and the maximum constant scanning speed ±V (mm/sec). The time Tc indicates a time needed for the carriage 48 to move over the entire width of the microcapsule sheet 37 in the direction X (that is, the time during which the maximum constant scanning speed is required). The time T indicates the reciprocal scan period.

For each exposure line (each line in the directions X in FIG. 11) on the microcapsule sheet 37, the exposure control for one set of red LEDs 7, one set of green LEDs 8 and one set of blue LEDs 9 is performed. In the exposure control, exposure of a dot in an exposure line is performed taking into consideration a delay time in accordance with the time required for a scanning movement of the carriage 48 and the time required for the conveyance of the microcapsule sheet 37 over the interval between the set of red LEDs 7, the set of green LEDs 8 and the set of blue LEDs 9 (pin hole interval).

The exposure control of a plurality of LEDs will be described with reference to FIG. 13. The diagram of FIG. 13 illustrates the exposure control of a plurality of LEDs.

Figure 13:
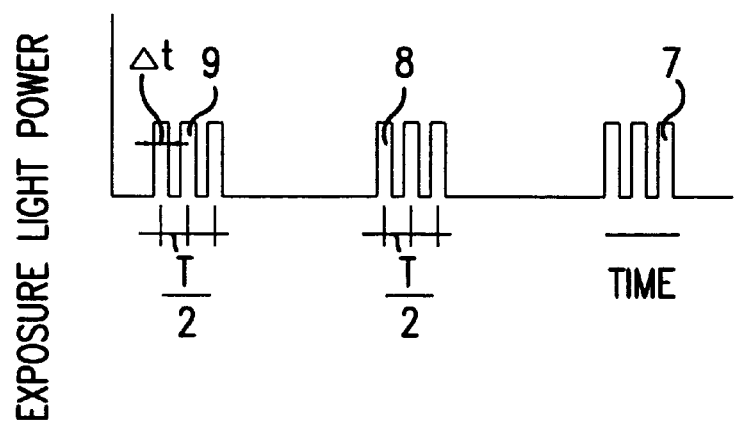
FIG. 13 illustrates the turning-on control of a plurality of LEDs.

The following description with reference to FIG. 13 is focused on one pixel (dot) in the microcapsule sheet 37. If the conveying distance in the direction Y corresponds to the size of a dot, a pixel point (exposure point) in the microcapsule sheet 37 can be made white by irradiating the pixel dot with blue light (B light), green light (G light) and red light (R light), for example, in the following manner. That is, when the pin hole 12 facing the blue LED 9C is positioned at the pixel point while the carriage 48 is being moved in a forward direction (in the direction X in FIG. 11), the blue LED 9C is turned on once for a predetermined short time Δt. After that, the carriage 48 is temporarily stopped at the end of the forward passage.

Subsequently, the microcapsule sheet 37 is conveyed a distance corresponding to one dot in the direction Y in FIG. 11, and then the carriage 48 is moved in the reverse direction (the direction X' in FIG. 11). When the pin hole 12 facing the blue LED 9B is positioned at the pixel point during the reverse movement of the carriage 48 in the direction X' in FIG. 11, the blue LED 9B is turned on once for the predetermined short time Δt. After that, the carriage 48 is temporarily stopped at the end of the reverse passage.

After the microcapsule sheet 37 is further conveyed the distance corresponding to one dot in the direction Y in FIG. 11 or FIG. 10, the carriage 48 is moved in the forward direction (the direction X in FIG. 11). When the pin hole 12 facing the blue LED 9A is positioned at the pixel point during the forward movement of the carriage 48 in the direction X in FIG. 11, the blue LED 9A is turned on once for the predetermined short time Δt. After that, the carriage 48 is temporarily stopped at the end of the forward passage.

In this manner, the blue LEDs 9 are sequentially turned on for the concerned pixel point for the short time Δt, substantially every half of the scanning period T in the order of 9C, 9B and 9A.

After that, the microcapsule sheet 37 is conveyed a distance (Y2) corresponding to 14 dots in the direction Y in FIG. 11, and then the carriage 48 is moved in the reverse direction (the direction X' in FIG. 11). When the pin hole 12 facing the green LED 8C is positioned at the pixel point during the reverse movement of the carriage 48 in the direction X' in FIG. 11, the green LED 8C is turned on once for the predetermined short time Δt. After that, the carriage 48 is temporarily stopped at the end of the reverse passage.

After the microcapsule sheet 37 is conveyed the distance corresponding to one dot in the direction Y in FIG. 11 or FIG. 10, the carriage 48 is moved in the forward direction (the direction X in FIG. 11). When the pin hole 12 facing the green LED 8B is positioned at the pixel point during the forward movement of the carriage 48 in the direction X in FIG. 11, the green LED 8B is turned on once for the predetermined short time Δt. After that, the carriage 48 is temporarily stopped at the end of the forward passage.

After the microcapsule sheet 37 is further conveyed the distance corresponding to one dot in the direction Y in FIG. 11 or FIG. 10, the carriage 48 is moved in the reverse direction (the direction X' in FIG. 11). When the pin hole 12 facing the green LED 8A is positioned at the pixel point during the reverse movement of the carriage 48 in the direction X' in FIG. 11, the green LED 8A is turned on once for the predetermined short time Δt. After that, the carriage 48 is temporarily stopped at the end of the reverse passage.

The microcapsule sheet 37 is then conveyed the distance (Y2) corresponding to 14 dots in the direction Y in FIG. 11. Then, the red LEDs 7 are sequentially turned on for the pixel for the predetermined short time Δt in the order of 7C, 7B and 7A, while the carriage 48 is being reciprocally moved. Thus, the exposure of the pixel point for the time Δt is performed nine times in total.

The above-described control of turning on the LEDs for the time Δt during a forward or reverse movement of the carriage 48 before conveyance of the microcapsule sheet 37 over the one-dot distance in the direction Y is performed for all the dots in each exposure line, by using all the nine LEDs. Therefore, during one forward or reverse movement of the carriage 48 carrying the exposure head 20, exposure is performed on nine lines in total.

In addition to the image modulation exposure, auxiliary exposure using the blue LED 9D and the green LED 8D is constantly performed during scanning exposure. The light energy for auxiliary exposure is set to a maximum light energy that does not harden the capsules, as mentioned above. The values of light energy from the blue LEDs 9A, 9B, 9C, the green LEDs 8A, 8B, 8C and the red LEDs 7A, 7B, 7C are set to the same value, although the maximum blue or green light energy that does not harden the corresponding capsules is greater than the maximum red light energy that does not harden the corresponding capsules. Since the blue LED 9D and the green LED 8D supply, through the respective pin holes 39, additional blue light energy and green light energy by the auxiliary exposure operation, the microcapsules for the three colors harden at substantially equal rates in accordance with the amount exposure light energy supplied by the image modulation exposure operation. If a pixel dot is exposed to light from all the LEDs 7, 8, 9 as described above, all the capsules in the pixel harden to the maximum hardening degree, so that when the pressured development is performed, all the capsules in the pixel remain undestroyed and, therefore, no coloring reaction occurs. That is, the color (white) of the internal surface of the sheet-shaped support 35 remains visible through the light-transmitting support 31.

In an actual image forming operation, the light energy emitted from the blue LEDs 9A, 9B, 9C, the green LED 8A, 8B, 8C and the red LEDs 7A, 7B, 7C for image modulation exposure, is varied in accordance with image data so as to form, in the microcapsule sheet 37, an exposed latent image (a latent image based on the pattern of changes in the hardening degree of the capsules) corresponding to the image data.

Figure 14:
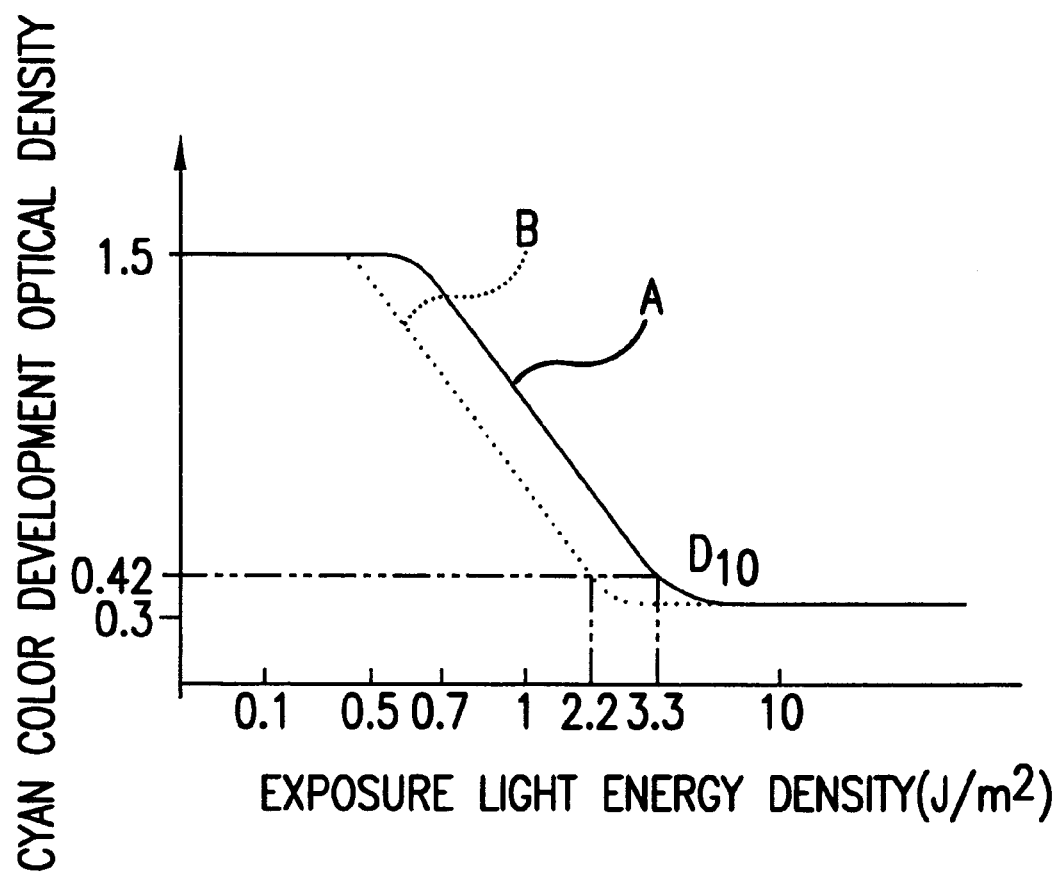
FIG. 14 is a graph indicating the relationship between the cyan coloration optical density and the exposure light energy density.

The reasons for irradiating a single spot (pixel point) in the microcapsule sheet 37 with exposure light a plurality of times at time intervals will be explained with reference to FIG. 14. FIG. 14 is a graph indicating the relationship between the cyan coloration optical density and the exposure light energy density.

In the graph of FIG. 14, the ordinate axis indicates the cyan coloration optical density, and the abscissa axis indicates the exposure energy density ($J/m^2$). The solid-line curve A indicates changes in the cyan coloration optical density when red-LED irradiation is performed by one operation. The broken-line curve B indicates changes in the cyan coloration optical density when red-LED irradiation is performed by three divided operations at time intervals of half the scanning period T.

To obtain a cyan coloration optical density of 10%, that is, $D_{10}=0.42$, an exposure light energy density of 3.3 $J/m^2$ is required if light irradiation is performed by one operation, as indicated in FIG. 14. However, if light irradiation is performed by three divided operations, only an exposure light energy density of 2.2 $J/m^2$ in total is required. As is apparent from this comparison and the graph of FIG. 14, the exposure light energy density needed to achieve a predetermined cyan coloration optical density, is less if light irradiation is performed by three divided operations than if light irradiation is performed by one operation, provided that the exposure light energy density is within the range of 0.5 to 3.3 $J/m^2$.

Specifically, the rate of polymerization between the polymerization initiator and the photo-setting resin in the microcapsules 32 in the microcapsule sheet 37 caused by light irradiation, is not very fast. The polymerization is more likely to be accelerated by supplying exposure light energy by a plurality of divided exposure operations (for example, two to six exposure operations) at appropriate time intervals, than by supplying exposure light energy by one operation. Therefore, even if the output power of each LED (light emitting element) is reduced or if the number of LEDs provided is reduced, it is possible to achieve a sufficient coloration optical density by exposure operations at increased time intervals.

In this embodiment, the drive time and emission light intensity of the LEDs for each exposure operation are set in consideration that exposure of a pixel is performed three times at the maximum. The total exposure light energy is divided by three to determine a value of the exposure light energy to be supplied by each exposure operation. However, if the thus-determined value is less than a predetermined reference value, the exposure light energy by an exposure operation must be re-calculated by reducing the number of exposure operations to two or one.

Normally, it is preferable to expose and develop the microcapsule sheet 37 at a constant speed throughout the process. To this end, the moving distance L (m) at a constant speed corresponding to the minimum constant speed time Tc needed for exposure and development of the microcapsule sheet 37 needs to cover at least the area over which the pin holes 12 of the exposure head 20 pass. The constant speed moving distance L (m) can be freely determined or designed on the basis of the width of the microcapsule sheet 37, the arranging pattern of the pin holes 12 and the maximum constant scanning speed V (mm/sec).

Figure 15:
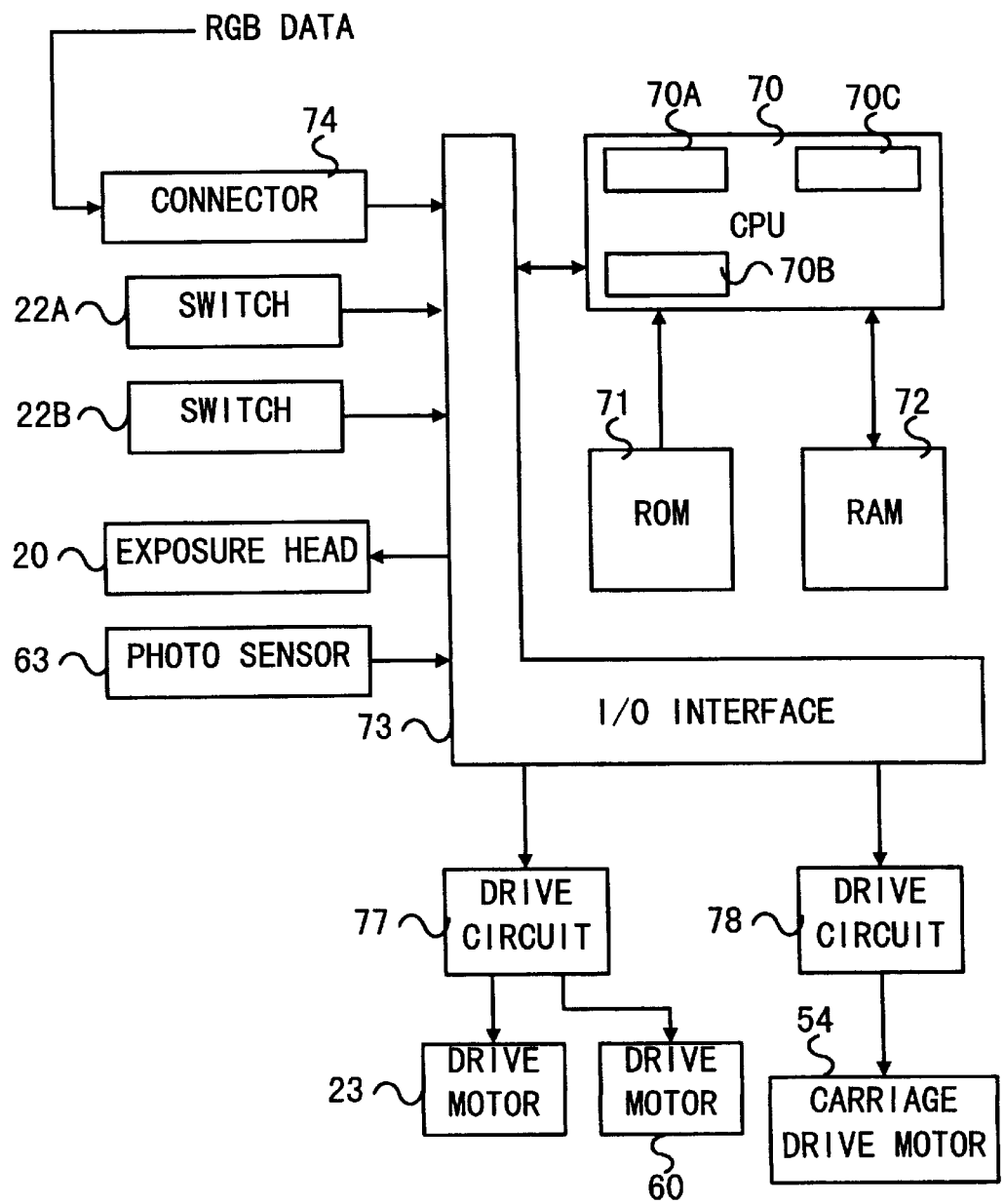
FIG. 15 is a schematic illustration of the electrical construction of a control circuit (control device) of the photosensitive and pressure-sensitive printer.

The electrical construction of a control circuit (control device) of the photosensitive and pressure-sensitive printer 80 will be described with reference to FIG. 15. FIG. 15 is a schematic illustration of the electrical construction of the control circuit (control device) of the photosensitive and pressure-sensitive printer 80.

The control circuit comprises known logic circuits, such as a CPU 70, a ROM 71, a RAM 72, and the like. The CPU 70 is connected to a connector 74 for inputting RGB image data from an external host computer, and the width detection sensors 22A, 22B for detecting the width of the microcapsule sheet 37, via an I/O port 73 formed by gate arrays, and the like. Furthermore, the exposure head 20 (each LED), a drive circuit 77 for the drive motor 23 of the first and second conveyance roller devices 21, 25 and the drive motor 60 of the development pressurizing roller device 45, a drive circuit 78 for the carriage driving motor 54, and the like are also connected to the CPU 70, via the I/O port 73.

The CPU 70 includes the width detection device 70A for detecting the width of the microcapsule sheet 37 based on signals from the width detection sensors 22A, 22B, the scan width changing device 70B for changing the scan width of the carriage 48 (the drive motor 54) in accordance with the width of the microcapsule sheet 37 based on a determination by the width detection device 70A, and the speed changing device 70C for changing the conveying speed of the first and second conveyance roller devices 21, 25 (the drive motor 23) and the developing speed of the pressurizing development device 45 (the drive motor 60), in accordance with the width of the microcapsule sheet 37 based on a determination by the width detection device 70A.

The ROM 71 stores various programs, such as programs for controlling the overall operation of the photosensitive and pressure-sensitive printer 80, programs for calculating and determining the time and timing of turning on each LED of the exposure head 20 based on the basis of input image data, programs for controlling the driving of the sheet feeding roller 65 and the discharge rollers 75, so as to convey the microcapsule sheet 37 in accordance with the order of the blue, green and red light exposure, programs for controlling the carriage driving motor 54 so as to reciprocally scan the carriage 48 in accordance with the order of the blue, green and red light exposure, and the like. The CPU 70 operates in accordance with these programs. The RAM 72 is a buffer for temporarily storing data input from an external device. When RGB image data of an output image is sent to the photosensitive and pressure-sensitive printer 80, the image data is sequentially stored into the buffer of the RAM 72.

The operation of the photosensitive and pressure-sensitive printer 80 will be described with reference to the flowchart of FIG. 16. Each LED of the exposure head 20 is electrically driven by a drive circuit (not shown), via a flexible harness 85 (see FIG. 2). While the exposure head 20 is moved together with the carriage 48, the on/off control of each LED is performed in accordance with image data.

When a user sets the cassette 67A or 67B into the printer 80 and turns on a power switch (not shown), each of the pre-heater 64A and the post-heater 64B is heated to a predetermined temperature by energization. After that, a print start instruction signal is input together with image data (RGB data) regarding an image that the user desires to output from the host computer to the printer. The image data is supplied as data in the form of a two-dimensional bit map. The image data includes information indicating the density of the R, G and B components in each pixel, and is separated into R image data, G image data and B image data, which are stored into the buffer of the RAM 72.

In response to the print start instruction signal, the CPU 70 causes the sheet feeding roller 65 to rotate so as to take out a microcapsule sheet 37 from the cassette 67A or 67B. The microcapsule sheet 37 is then conveyed to the left in FIGS. 1–3, that is, to the exposure table 66 disposed below the exposure head 20, by the first conveyance roller device 21. A printing operation is then started.

Figure 16:
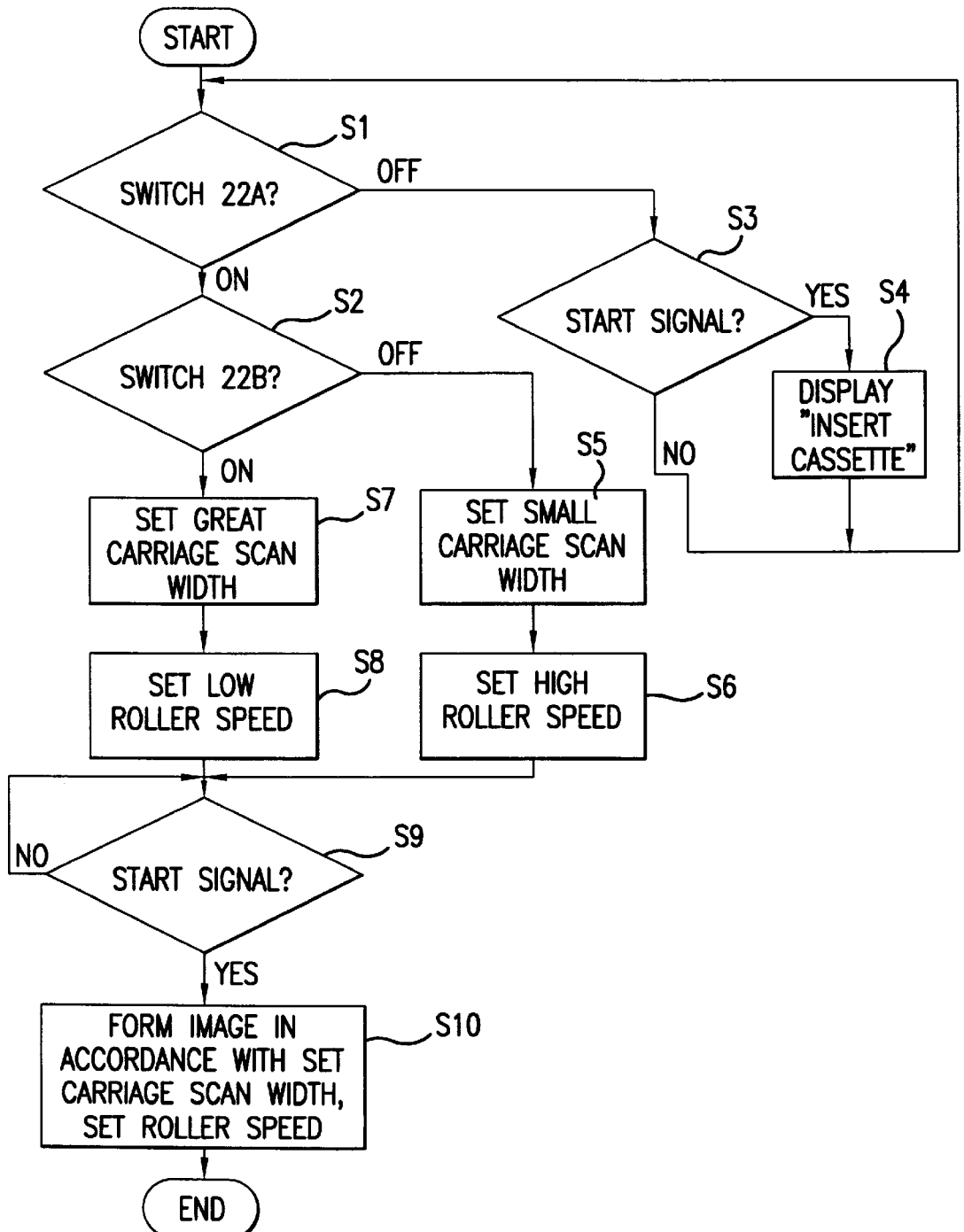
FIG. 16 is a flowchart illustrating the operation of the photosensitive and pressure-sensitive printer.

When the printing operation is started, the CPU 70 determines whether the width detection sensors 22A, 22B are on in steps S1, S2 in FIG. 16, in order to detect the presence of the microcapsule sheet 37 and the width thereof. If the width detection sensor 22A is off, it is assumed that a microcapsule sheet 37 has not been taken out of the cassette. Then, the CPU 70 determines in step S3 whether there is a start signal. If the start signal is present, the CPU 70 displays "INSERT CASSETTE" in a display unit (not shown) in step S4, in order to call attention of the operator. If the start signal is not present, the operation returns to step S1.

If the width detection sensor 22A is on but the width detection sensor 22B (disposed outwardly) is off, it is assumed that a smaller-width microcapsule sheet 37 has been taken out. Therefore, the CPU 70 sets a smaller scan width, that is, a smaller range of reciprocal movements of the carriage 48, in step S5. The time required for exposure is therefore short, so that the CPU 70 sets an increased speed of conveyance performed by the pressure development rollers 46A, 46B of the pressurizing development device 45 in step S6, thereby increasing the developing speed. If the width detection sensors 22A, 22B are both on, it is assumed that a larger-width microcapsule sheet 37 has been taken out. Therefore, the CPU 70 sets a larger scan width of the carriage 48 in step S7, and sets a reduced conveying speed of the pressure development rollers 46A, 46B of the pressurizing development device 45 in step S8, thereby reducing the developing speed. The conveying speed of the development pressurizing rollers 46A, 46B is controlled by CPU 70 that controls the drive motor 60.

After that, the CPU 70 determines in step S9 whether the start signal is present again. If the start signal is present, image formation is performed in accordance with the set scan width of the carriage 48 and the set roller conveying speed in step S10. This operation then ends. Conversely, if the start signal is not present, the CPU 70 repeats the determination in step S9 until the start signal is present.

The image formation will be described with respect to one exposure point in the microcapsule sheet 37. First, based on the B image data regarding the exposure point, the exposure control for the blue LEDs 9A, 9B, 9A for the exposure point is performed sequentially as the microcapsule sheet 37 is conveyed one dot at a time, while the corresponding timing is maintained between the exposure control and the movement of the carriage 48. After a predetermined time t, the exposure control of the green LEDs 8C, 8B, 8A for the exposure point is similarly performed based on the G image data regarding the exposure point. At the elapse of another predetermined time t, the exposure control of the red LEDs 7C, 7B, 7A is performed based on the R image data regarding the exposure point. This exposure control is actually performed for all the exposure points on each exposure line. The exposure control of, for example, the red LEDs 7C, 7B, 7A, will be more specifically described. When the exposure point exposed by the red LED 7C comes to face the red LED 7B after one-dot sheet conveyance and movements of the carriage 48, the exposure control of the red LED 7B is performed on the basis of the same R image data that was used for the exposure control of the red LED 7C for the exposure point. Then, when the microcapsule sheet 37 is conveyed another dot and the carriage 48 is moved so that the exposure point comes to face the red LED 7A, the exposure control of the red LED 7A is performed on the basis of the R image data regarding the exposure point.

After the exposure line is exposed as described above, the exposed line is pressure-developed by the development device 45 while being conveyed. The exposed microcapsules 32 are sufficiently photo-hardened. Only the microcapsules 32 that are not photo-hardened are destroyed by the pressurized development, so that coloring reactions occur. After being developed, the microcapsule sheet 37 is heated to about 50° C. by the post-heater 64B in order to fix the final color output image. The microcapsule sheet 37 is then discharged onto the discharge portion 82.

It is to be understood that the invention is not restricted to the particular forms shown in the foregoing embodiment. Various modifications and alternations can be made thereto without departing from the scope of the invention.

Figure 19:
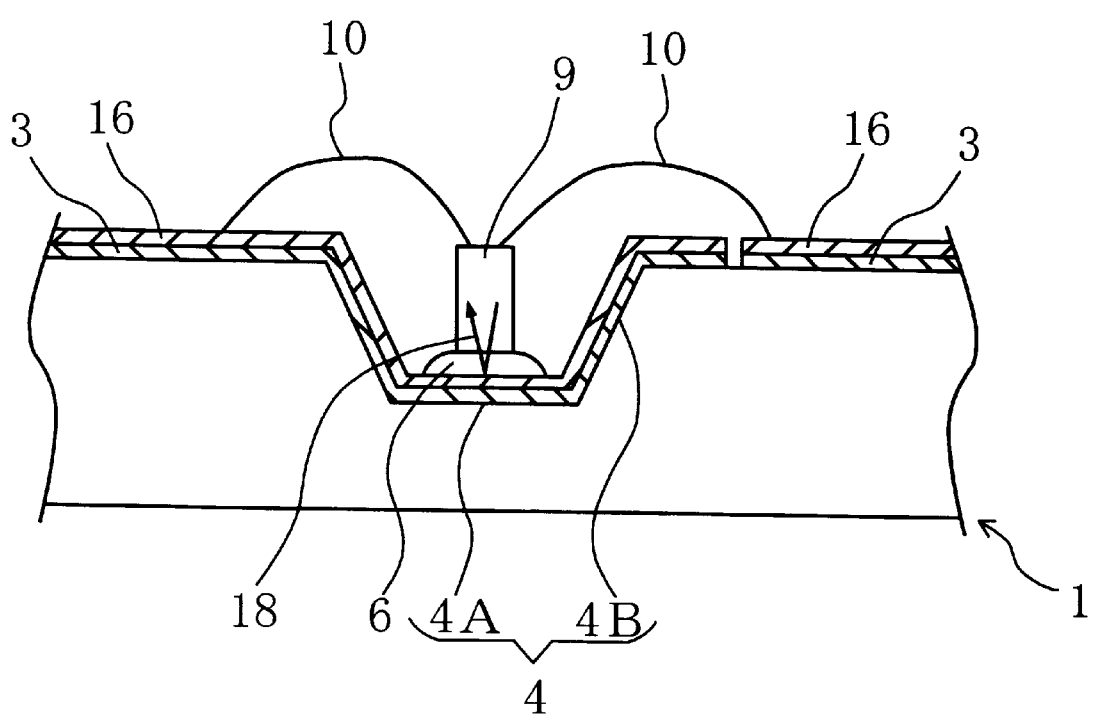
FIG. 19 is an enlarged sectional view of a modification of the structure around the light emitting elements provided in the exposure head.

For example, although in the foregoing embodiment, the reflecting aluminum member 17 is provided on a thin film, it is also possible to form the thin film (bonding pad 16) from a material that has a reflectivity of at least about 50% to the blue light from each blue light emitting element 9 with respect to the regular reflection component, as shown in FIG. 19. In this modification, part of the blue light from the light emitting element 9 may travel to the adhered surface of the light emitting element 9, but it is reflected by the thin film without being absorbed by the thin film, so that that part of the blue light is re-directed toward the photosensitive recording medium. Since the need for the reflecting aluminum member 17 is thus eliminated, it becomes possible to further reduce the number of production processes and the production cost.

In this case, it is also possible to form the thin film (bonding pad 16) by aluminum vapor deposition. In this modification, the reflectivity of aluminum to blue light (represented by a wavelength of 450 nm) with respect to the regular reflection component is 92.2%, whereas the reflectivity of gold in the conventional art is 38.7%. Therefore, most of blue light generated in the light emitting elements is not absorbed by the thin film but directed toward the photosensitive recording medium. Consequently, it becomes possible to considerably increase the power of light emitted from the blue light emitting elements 9 provided in the exposure head 20.

The material of the thin film (bonding pad 16) is not limited to aluminum but may comprise various other materials, for example, nickel, chrome, silver, and the like. The material is not limited to metal, but may be a dielectric thin film formed on the reflecting surface. The thin film may also be formed by applying a material that meets the aforementioned reflection requirement onto an electrically insulating film. The method for forming the thin film is not limited to vapor deposition, but may be various other methods, for example, etching, sputtering, print-applying, coating, and the like.

Although in the forgoing embodiment, the recesses 4 are formed in the base board 1 of the exposure device, it is also possible to form a thin film with high reflectivity as mentioned above on a flat base board that does not have the recesses 4.

Figure 17:
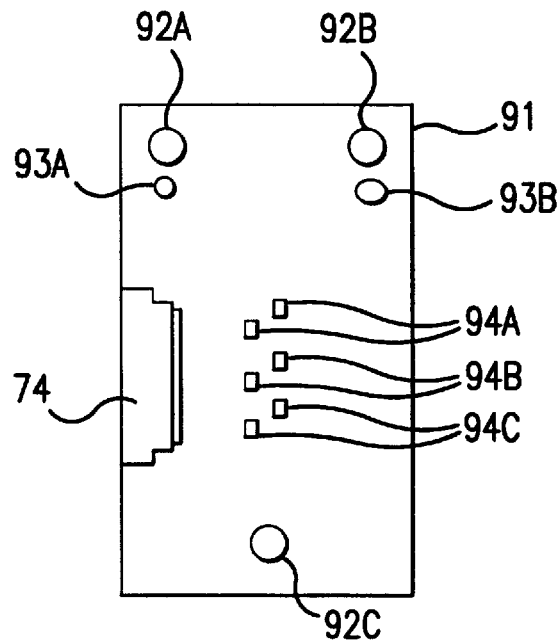
FIG. 17 is a plan view of a base board of an exposure head provided with a condensing lens.
Figure 18:
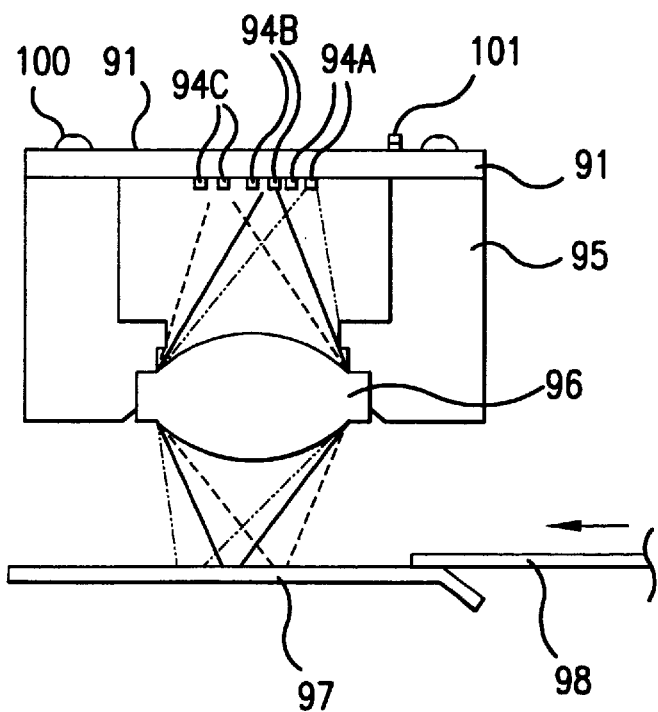
FIG. 18 is a side view illustrating the construction of the condensing lens-equipped exposure head.

Although the foregoing embodiment employs a close contact-type exposure head 20 provided with the mask 13 having the pin holes 12, it is also possible to employ an exposure head provided with a condensing lens instead of the pin holes 12. The construction of such an exposure head will be described with reference to FIGS. 17 and 18. FIG. 17 is a plan view of a base board 91 of the exposure head provided with a condensing lens. FIG. 18 is a side view illustrating the construction of the condensing lens-equipped exposure head.

As shown in FIG. 17, three mounting holes 92A, 92B, 92C and two positioning holes 93A, 93B are formed in an LED base board 91 formed from a glass-epoxy resin or an aluminum alloy. Red LEDs 94A, 94A, blue LEDs 94B, 94B and green LEDs 94C, 94C are disposed in that order on the base board 91. The base board 91 is attached to a side portion of a carriage 95, together with an imaging lens 96 (aspherical glass lens), as shown in FIG. 18. Light from the LEDs 94A, 94A, 94B, 94B, 94C, 94C is converged on a microcapsule sheet 98 on an exposure table 97, by the imaging lens 96. In FIG. 18, screws 100 are inserted into the mounting holes 92A–92C, and positioning pins 101 are inserted into the positioning holes 93A, 93B. Unlike the close contact type, this exposure head is free from problems such as the exposure head contacting and scraping the surface of a photosensitive recording medium, a pin hole being closed by dust or the like, noises being produced, and the like.

The light emitting elements 7, 8, 9 are not limited to LEDs, but may be formed by various other light emitting elements that can be used in such a construction that reflection affects the power of emission light, for example, electroluminescent (EL) light emitting elements, plasma light emitting elements, laser light emitting elements, and the like. The number of colors or kinds of the light emitting elements are not limited to three, but may be one or two. Furthermore, four or more colors may be used as in ordinary color printers wherein yellow, magenta, cyan and black are used as color producing agents. Although in the foregoing embodiment, auxiliary exposure is performed for green and blue and not for red, it is also possible to perform auxiliary exposure for only one of green and blue. Furthermore, auxiliary exposure for red may also be performed depending on the size of a dark area in an image. Thus, if auxiliary exposure is performed for at least one color regardless of whether the color is red, green or blue, or yellow, magenta or cyan, it is possible to achieve advantages of the foregoing embodiment, for example, reduction of the number of LEDs required and reduction of drive energy.

The photosensitive recording medium used according to the invention is not limited to the microcapsule sheet 37, but various other photosensitive recording sheets may also be used. Regarding microcapsule sheets, transfer-type sheets may also be used, instead of the self-coloring type as described above. In a possible modification, a transparent base sheet carrying microcapsules and an image receiving sheet carrying color developers are peelably laminated, with the microcapsule-carrying surface of the transparent base sheet being in contact with the developer-carrying surface of the image receiving sheet. The laminate sheet is fed from a cassette, with the base sheet side facing the side of the exposure head, and then the sheet is exposed and developed. After the laminate sheet is discharged out of the apparatus, the image receiving sheet is peeled from the base sheet. In this laminate sheet, when microcapsules are destroyed by pressurization, dye precursors or coloring materials flow out of the microcapsules, and transfer to the side of the color developers in the image receiving sheet, and react with the developers so as to produce colors and make the image visible.

Furthermore, microcapsules may contain, together with photosensitive substances, pre-colored pigments or dyes in microcapsules instead of dye precursors. With this modification, a base sheet carrying capsules and an image receiving sheet not having a developer (for example, a normal paper sheet) may be peelably laminated together, so that transfer-type image formation can be achieved. By peeling the image receiving sheet from the base sheet after exposure and development, an image becomes visible on the image receiving sheet.

Further, the pressurized development device does not necessarily employ line-contact rollers as described above, but may also employ a point-contact ball, a point-contact pressurizing roller, and the like.

What is claimed is:

1. An image forming apparatus comprising:
   a photosensitive recording medium having a photosensitive material that is sensitive to light having a predetermined wavelength;
   an exposure device that irradiates the photosensitive recording medium with light having the predetermined wavelength; and
   a development device that develops the photosensitive recording medium exposed by the exposure device,
   the exposure device including a light emitting element that emits blue light, a base on which the light emitting element is provided, a thin film formed on the base, and a reflecting member provided on the thin film, wherein the reflecting member is formed from a material having a reflectivity of at least about 50% to blue light from the light emitting element with respect to a regular reflection component.

2. The image forming apparatus according to claim 1, wherein light emitted from the light emitting element is modulated in accordance with image information.

3. The image forming apparatus according to claim 2, further comprising a drive device that drives at least one of the exposure device relative to the photosensitive recording medium and the photosensitive recording medium relative to the exposure device.

4. The image forming apparatus according to claim 3, wherein the light emitting element is a blue LED.

5. The image forming apparatus according to claim 4, wherein the blue LED is scanned against the photosensitive recording medium in the X-direction and Y-direction, relative to the photosensitive recording medium.

6. The image forming apparatus according to claim 5, wherein the exposure device further includes a mask.

7. The image forming apparatus according to claim 2, wherein the reflecting member includes a reflecting layer formed by a vapor deposition method.

8. The image forming apparatus according to claim 2, wherein the reflecting member is formed from aluminum.

9. The image forming apparatus according to claim 2, wherein the reflecting member is formed from at least one of nickel, chrome and silver.

10. The image forming apparatus according to claim 2, wherein the reflecting member is formed from a dielectric coating.

11. The image forming apparatus according to claim 2, wherein the reflecting member is formed from an insulating film.

12. The image forming apparatus according to claim 2, wherein the reflecting member includes a reflecting layer formed by one of an etching method, a sputtering method, a print-applying method and a coating method.

13. An image forming apparatus comprising:
    a photosensitive recording medium having a photosensitive material that is sensitive to light having a predetermined wavelength;
    an exposure device that irradiates the photosensitive recording medium with light having the predetermined wavelength; and
    a development device that develops the photosensitive recording medium exposed by the exposure device,
    wherein the exposure device includes a light emitting element that emits blue light, a base on which the light emitting element is provided, and a thin film formed on the base, the thin film being formed from a material having a reflectivity of at least about 50% to blue light from the light emitting element with respect to a regular reflection component, the thin film reflecting the light from the light emitting element, and the thin film having electrical conductivity so as to supply electrical power to the light emitting element.

14. The image forming apparatus according to claim 13, wherein light emitted from the light emitting element is modulated in accordance with image information.

15. The image forming apparatus according to claim 14, further comprising a drive device that drives at least one of the exposure device relative to the photosensitive recording medium and the photosensitive recording medium relative to the exposure device.

16. The image forming apparatus according to claim 15, wherein the light emitting element is a blue LED.

17. The image forming apparatus according to claim 16, wherein the blue LED is scanned against the photosensitive recording medium in the X-direction and the Y-direction, relative to the photosensitive recording medium.

18. The image forming apparatus according to claim 17, wherein the exposure device further includes a mask.

19. The image forming apparatus according to claim 14, wherein the thin film is formed on the base by a vapor deposition method.

20. The image forming apparatus according to claim 14, wherein the thin film is formed from aluminum.

21. The image forming apparatus according to claim 14, wherein the thin film is formed from at least one of nickel, chrome and silver.

22. The image forming apparatus according to claim 14, wherein the thin film includes a dielectric coating.

23. The image forming apparatus according to claim 14, wherein the thin film includes an insulating film.

24. The image forming apparatus according to claim 14, wherein the thin film includes a reflecting layer formed by one of an etching method, a sputtering method, a print-applying method and a coating method.

25. A method of forming an image forming apparatus, comprising:
    forming a photosensitive recording medium having a photosensitive material that is sensitive to light having a predetermined wavelength;
    forming an exposure device that irradiates the photosensitive recording medium with light having the predetermined wavelength; and
    forming a development device that develops the photosensitive recording medium exposed by the exposure device,
    the exposure device including a light emitting element that emits blue light, a base on which the light emitting element is provided, a thin film formed on the base, and a reflecting member provided on the thin film, wherein the reflecting member is formed from a material having a reflectivity of at least about 50% to blue light from the light emitting element with respect to a regular reflection component, and light emitted by the light emitting element being modulated in accordance with image information.

* * * * *